US009527751B2

(12) United States Patent
Maurer et al.

(10) Patent No.: US 9,527,751 B2
(45) Date of Patent: Dec. 27, 2016

(54) ORGANOTEMPLATE-FREE SYNTHETIC PROCESS FOR THE PRODUCTION OF A ZEOLITIC MATERIAL OF THE CHA-TYPE STRUCTURE

(71) Applicant: BASF SE, Ludwigshafen (DE)

(72) Inventors: Stefan Maurer, Ludwigshafen (DE); Hanpeng Jin, München (DE); Jeff Yang, Mannheim (DE); Ulrich Müller, Neustadt (DE)

(73) Assignee: BASF SE, Ludwigshafen (DE)

( * ) Notice: Subject to any disclaimer, the term of this patent is extended or adjusted under 35 U.S.C. 154(b) by 951 days.

(21) Appl. No.: 13/673,661

(22) Filed: Nov. 9, 2012

(65) Prior Publication Data

US 2013/0129611 A1  May 23, 2013

Related U.S. Application Data

(60) Provisional application No. 61/558,491, filed on Nov. 11, 2011.

(51) Int. Cl.
*C01B 39/02* (2006.01)
*B01J 29/70* (2006.01)
*C01B 39/46* (2006.01)

(52) U.S. Cl.
CPC ............ *C01B 39/02* (2013.01); *B01J 29/7015* (2013.01); *C01B 39/026* (2013.01); *C01B 39/46* (2013.01)

(58) Field of Classification Search
CPC ........ C01B 39/02; C01B 39/46; C01B 39/026; B01J 29/7015
See application file for complete search history.

(56) References Cited

U.S. PATENT DOCUMENTS

| | | | | |
|---|---|---|---|---|
| 4,503,024 A | * | 3/1985 | Bourgogne | ......... C01B 33/2869 423/709 |
| 4,544,538 A | * | 10/1985 | Zones | ...................... B01J 29/70 423/706 |
| 6,974,889 B1 | * | 12/2005 | Verduijn | ............... B01J 20/0292 423/305 |
| 7,067,108 B2 | | 6/2006 | Mertens et al. | |
| 8,293,198 B2 | | 10/2012 | Beutel et al. | |
| 8,293,199 B2 | | 10/2012 | Beutel et al. | |
| 2009/0196812 A1 | | 8/2009 | Bull et al. | |
| 2011/0130579 A1 | | 6/2011 | Muller et al. | |
| 2011/0142755 A1 | | 6/2011 | Bull et al. | |
| 2011/0260100 A1 | | 10/2011 | Trukhan et al. | |
| 2011/0312486 A1 | | 12/2011 | Yilmaz et al. | |
| 2012/0004332 A1 | | 1/2012 | Yilmaz et al. | |
| 2012/0014865 A1 | | 1/2012 | Bull et al. | |
| 2012/0014866 A1 | | 1/2012 | Bull et al. | |
| 2012/0014867 A1 | | 1/2012 | Bull et al. | |
| 2012/0049110 A1 | | 3/2012 | Trukhan et al. | |
| 2012/0082864 A1 | | 4/2012 | Leung et al. | |
| 2012/0141685 A1 | | 6/2012 | Gaab et al. | |
| 2012/0142950 A1 | | 6/2012 | Teles et al. | |
| 2012/0244066 A1 | | 9/2012 | Bull et al. | |
| 2012/0251438 A1 | | 10/2012 | Trukhan et al. | |
| 2012/0259141 A1 | | 10/2012 | Yilmaz et al. | |
| 2012/0259148 A1 | | 10/2012 | Yilmaz et al. | |
| 2012/0270731 A1 | | 10/2012 | Gaab et al. | |

FOREIGN PATENT DOCUMENTS

| | | |
|---|---|---|
| CN | 101983103 | 1/2009 |
| CN | 102134081 | 7/2011 |
| CN | 102285666 | 12/2011 |
| CN | 102442679 | 5/2012 |
| WO | WO-2010/054034 | 5/2010 |
| WO | WO-2010/146156 | 12/2010 |
| WO | WO-2011/064186 | 6/2011 |

(Continued)

OTHER PUBLICATIONS

Robson, Ed., Verified Syntheses of Zeolitic Materials, 2nd rev. ed. (2001).*
Baerlocher, CH. et al., "Atlas of Zeolite Framework Types", *5th Revised Edition* 2001 , pp. 1-100.
Hasegawa, Y. et al., "Preparation of Novel Chabazite (CHA)-type Zeolite Layer On Porous αAl$_2$O$_3$ Tube Using Template-Free Solution", *Journal of Membrane Science*, 347 2010 , pp. 193-196.
Li, Xiansen et al., "Influence of the Hydrothermal Synthetic Parameters on the Pervaporative Separation Performances of CHA-type Zeolite Membranes", *Microporous and Mesoporous Materials*, 143 2011 , pp. 270-276.

(Continued)

*Primary Examiner* — David M Brunsman
(74) *Attorney, Agent, or Firm* — Oblon, McClelland, Maier & Neustadt, L.L.P.

(57) ABSTRACT

The present invention relates to an organotemplate-free synthetic process for the production of a zeolitic material having a CHA-type framework structure comprising $YO_2$, $X_2O_3$, and optionally comprising $Z_2O_5$, wherein said process comprises the steps of:

(1) providing a mixture comprising one or more sources for $YO_2$, one or more sources for $X_2O_3$, and seed crystals having a CHA framework structure, wherein the CHA framework structure of the seed crystals comprises $YO_2$, $X_2O_3$, and optionally comprises $Z_2O_5$; and (2) crystallizing the mixture obtained in step (1);

wherein Y is a tetravalent element, X is a trivalent element, and Z is a pentavalent element, wherein optionally one or more sources for $Z_2O_5$ are further provided in step (1), and wherein if the CHA framework of the seed crystals does not contain $Z_2O_5$, the seed crystals then have a $YO_2:X_2O_3$ molar ratio of 5 or greater than 5.

39 Claims, 15 Drawing Sheets

(56) References Cited

FOREIGN PATENT DOCUMENTS

| WO | WO-2011/064191 | 6/2011 |
|---|---|---|
| WO | WO-2011/064307 | 6/2011 |
| WO | WO-2011/073390 | 6/2011 |
| WO | WO-2011/073398 | 6/2011 |
| WO | WO-2011/132147 | 10/2011 |
| WO | WO-2011/158218 | 12/2011 |
| WO | WO-2011/158219 | 12/2011 |
| WO | WO-2012/001663 | 1/2012 |
| WO | WO-2012/007873 | 1/2012 |
| WO | WO-2012/007874 | 1/2012 |
| WO | WO-2012/007914 | 1/2012 |
| WO | WO-2012/028989 | 3/2012 |
| WO | WO-2012/042410 | 4/2012 |
| WO | WO-2012/076543 | 6/2012 |
| WO | WO-2012/077030 | 6/2012 |
| WO | WO-2012/137132 | 10/2012 |
| WO | WO-2012/137133 | 10/2012 |
| WO | WO-2012/143878 | 10/2012 |
| WO | WO-2012/145323 | 10/2012 |

OTHER PUBLICATIONS

PCT International Search Report in PCT/IB2012/056292, mailed Apr. 4, 2013, 5 pgs.

Akporiaye, Duncan E. et al., "Aluminum Distribution in Chabazite: An Experimental and Computational Study", *J. Phys. Chem.* 100 1996, 4148-4153.

Extended European Search Report in EP12847478, dated Jul. 2, 2015, 11 pages.

Office Action dated May 4, 2016 for Chinese Application No. 201280066497.6 with English Abstract.

* cited by examiner

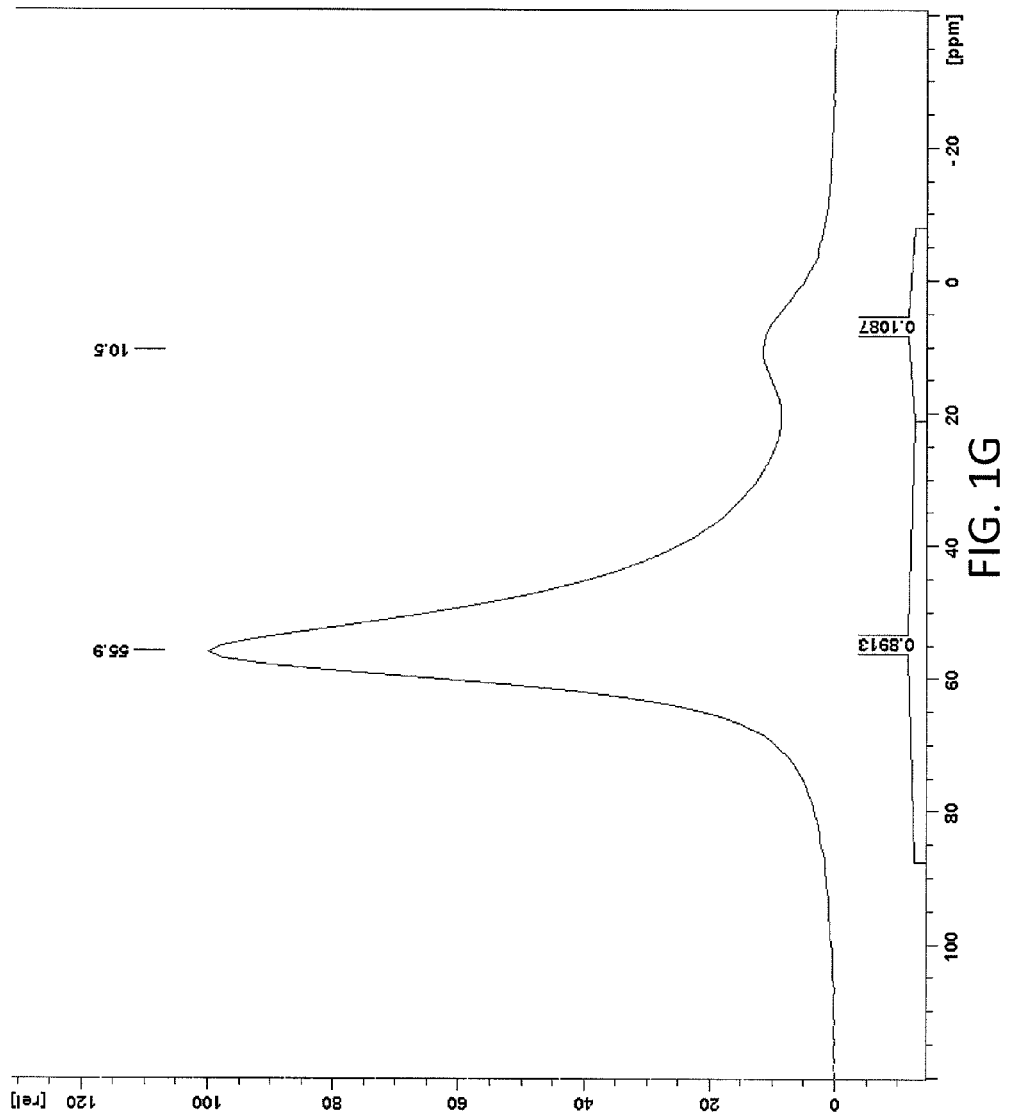

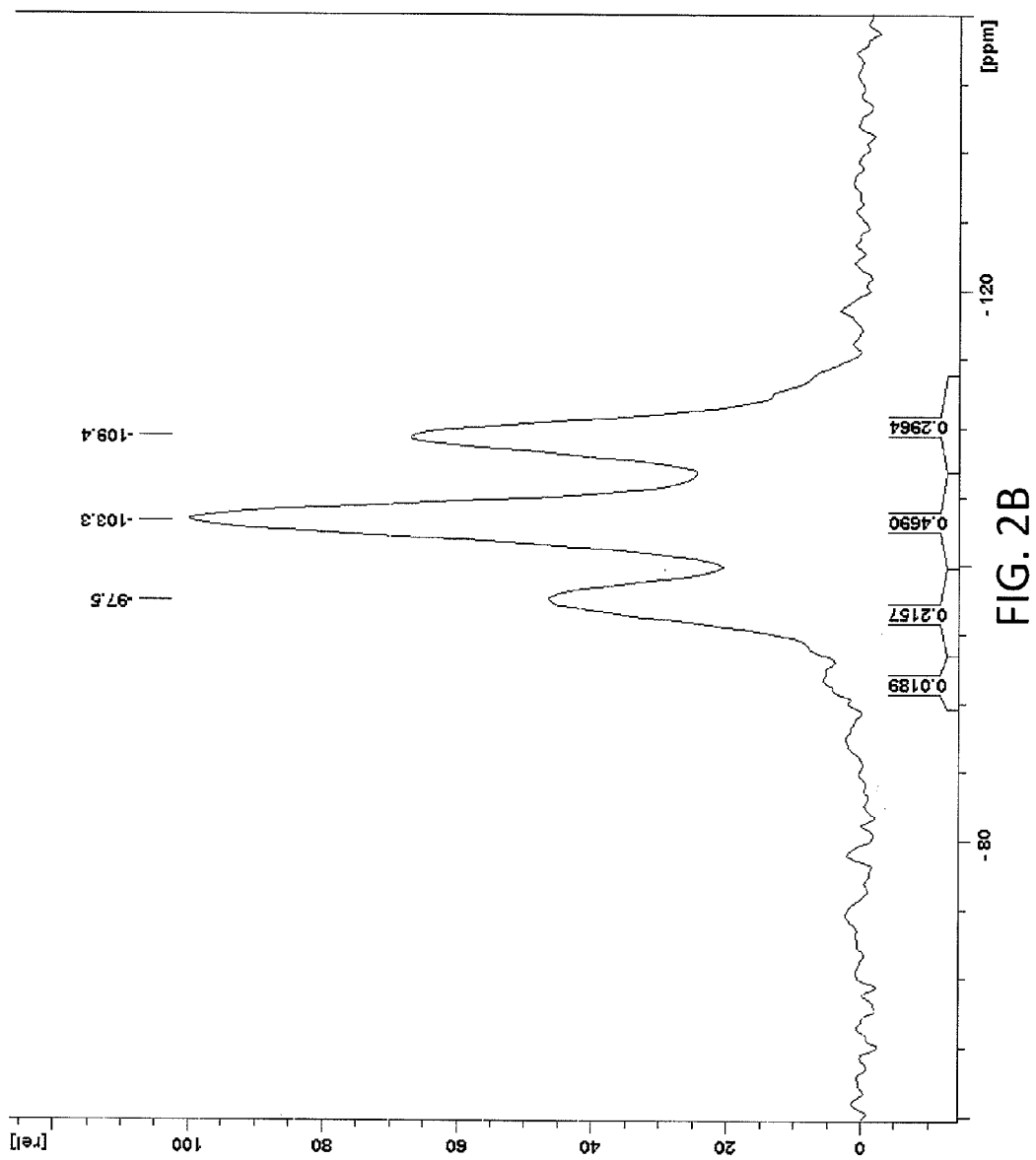

ORGANOTEMPLATE-FREE SYNTHETIC PROCESS FOR THE PRODUCTION OF A ZEOLITIC MATERIAL OF THE CHA-TYPE STRUCTURE

CROSS-REFERENCE TO RELATED APPLICATIONS

This application claims priority to U.S. Provisional Application No. 61/558,491, filed Nov. 11, 2011, the contents of which are hereby incorporated by reference in their entirety.

TECHNICAL FIELD

The present invention relates to a synthetic organotemplate-free zeolitic material with a CHA-type framework structure and to a process for the production of said material which does not involve the use of an organotemplate. Furthermore, the present invention relates to the use of a synthetic organotemplate-free zeolitic material having a CHA-type framework structure.

BACKGROUND

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a structure has been established, are assigned a three letter code and are described in the Atlas of Zeolite Framework Types, 5th edition, Elsevier, London, England (2001).

Among said zeolitic materials, Chabazite is a well studied example, wherein it is the classical representative of the class of zeolitic materials having a CHA framework structure. Besides aluminosilicates such as Chabazite, the class of zeolitic materials having a CHA framework structure comprises a large number of compounds further comprising phosphorous in the framework structure are known which are accordingly referred to as silicoaluminophosphates (SAPO). In addition to said compounds, further molecular sieves of the CHA structure type are known which contain aluminum and phosphorous in their framework, yet contain little or no silica, and are accordingly referred to as aluminophosphates (APO). Zeolitic materials belonging to the class of molecular sieves having the CHA-type framework structure are employed in a variety of applications, and in particular serve as heterogeneous catalysts in a wide range of reactions such as in methanol to olefin catalysis and selective catalytic reduction of nitrogen oxides $NO_x$ to name some two of the most important applications. Zeolitic materials of the CHA framework type are characterized by three-dimensional 8-membered-ring (8MR) pore/channel systems containing double-six-rings (D6R) and cages.

U.S. Pat. No. 7,067,108 B2 discloses zeolites of Chabazite framework type. These zeolites are prepared by employing a specific seeding material, namely a crystalline material having a framework type other than Chabazite framework type, such as AEI type, LEV type, or OFF type, in addition to N,N,N-trimethyl-1-adamantylammonium hydroxide used as the structure directing agent.

U.S. Pat. No. 6,974,889 B1 on the other hand discloses a process for the manufacture of a crystalline molecular sieve, such as zeolites of structure type CHA or LEV, containing phosphorus in its framework, wherein tetraethyammonium hydroxide is used as the templating agent, and wherein a colloidal crystalline molecular sieve is used as seed material. In particular, said document teaches the use of seed crystals having the structure type LEV, OFF, or CHA, wherein said seed crystals should be as small as possible for controlling the particle size of the product as well as for accelerating its formation. Specifically, the synthesis of SAPO-34 is disclosed in said document using colloidal solutions of Chabazite crystals.

Although some progress has been achieved regarding the costs of the organotemplate used in the synthesis of CHA-type zeolites, as well as with respect to the duration of the synthetic process, the major drawback remains with respect to the necessary use of a structure directing agent which must be subsequently removed. In this event, the organotemplates are contained in the pore structure of the resulting zeolite, such that it may first be effectively employed in an application only after removal thereof. Furthermore, the organotemplate may usually only be removed by a calcination process or the like, such that a recycling of the organotemplate is not possible. Another disadvantage concerns the decomposition of the organic template material during hydrothermal synthesis, which not only makes it necessary to employ reaction vessels displaying a high pressure resistance, but also limits the possibility of recycling materials used in synthesis due to the presence of waste products from organic decomposition. As a result of these constraints, the known procedures for the production of CHA-type zeolite materials are highly cost-intensive, making these zeolites unattractive for a variety of applications.

Furthermore, the necessary removal of the organotemplate by calcination at higher temperatures, normally at 450 to 930° C. or even higher, is not only disadvantageous due to the destroyal of costly organic template, but also results in excess energy consumption and produces harmful gases and other unwanted waste products. In addition to this, the harsh thermal treatment ultimately limits the types of architectures which may be provided according to the known production methods. In particular, although ion exchange methods for extracting the organotemplate from the zeolitic material have been developed as an environmentally friendly alternative to calcination for removing the organic template, only part of the organic templates may successfully be recycled, the remainder interacting too strongly with the zeolite framework for complete removal. Accordingly, the synthesis of CHA-type zeolite materials which are devoid of an organotemplate remains effectively limited to those materials capable of withstanding the harsh conditions necessary for the complete removal of the organotemplates necessarily used in the synthesis thereof. As a result of this, the harsh thermal treatment ultimately limits the production to thermally stable CHA-type zeolite materials, in particular to those which display a high $SiO_2:Al_2O_3$ molar ratio.

In Hasegawa et al., Journal of Membrane Science 2010, 347, 193-196, a process for the preparation of a Chabazite-type zeolite layer on a porous $\alpha$-$Al_2O_3$ tube is disclosed wherein said synthesis is achieved by the use of seeding crystals having the CHA framework structure in combination with the use of strontium as the structure directing agent in the seeded synthesis, wherein the seed crystals have been obtained from inter-zeolitic transformation of Y-type zeolite into CHA-type zeolite. Li et al. in Microporous and Mesoporous Materials 2011, 143, 270-276, on the other hand, also reports the synthesis of Chabazite-type zeolite layers on porous $\alpha$-$Al_2O_3$ substrates using CHA-seeding materials obtained from inter-zeolitic transformation of Y-type zeolite into CHA-type zeolite, wherein, however, as opposed to Hasegawa et al., potassium is employed as the structure directing agent in the synthetic process. Said processes are, however, highly limited by the fact that the CHA-type zeolitic material used as the seeding agent is specifically obtained from inter-zeolitic transformation, as a result of which the CHA-type zeolitic materials which may be obtained from such processes are equally very limited. In particular, the Si to Al ratios available for said seeding materials obtained from inter-zeolitic transformation are highly limited such that only materials having very low Si to Al ratios may be used. Thus, the seeding material employed in Hasegawa et al. displays an $SiO_2:Al_2O_3$ molar ratio of only 4.8 for obtaining a product having an $SiO_2:Al_2O_3$ molar ratio of 6.4. Li et al., on the other hand, only allows for the production of zeolitic materials having the CHA-type framework structure with an $SiO_2:Al_2O_3$ molar ratio of 5.72.

Consequently, there remains a considerable need for a process for the organotemplate-free production of a zeolitic material having a CHA-type framework structure which may provide a large number of different zeolitic materials having a wide range of physical and chemical properties which is in particular reflected by the $SiO_2:Al_2O_3$ molar ratios present in said materials. Furthermore, there is a particular need for the provision of an organotemplate-free synthetic process which is truly template-free and not bound to the specific use of other ions as structure directing agents which is again highly limiting with respect to the range of different zeolitic materials which may be produced and the specific respective chemical and physical properties which may be obtained.

Furthermore, apart from the considerable restrictions of the processes known from the prior art, there also remains a considerable need for a cost efficient process which affords a microcrystalline product, the processes respectively known from Hasegawa and Li et al. involving the use of bulky support materials and excessive amounts of seeding material compared to the actual amount of zeolite obtained. Furthermore, the products in Hasegawa and Li et al. may only be obtained in the form of membrane layers supported on bulky composite support materials respectively consisting of a specific zeolite seeding material provided on a solid support.

Accordingly, there also exists a need for an organotemplate-free synthetic process which may provide a microcrystalline zeolitic material having the CHA-type framework structure.

SUMMARY

One aspect of the invention relates to an organotemplate-free synthetic process for the production of a zeolitic material having a CHA-type framework structure comprising $YO_2$, $X_2O_3$, and optionally comprising $Z_2O_5$, wherein said process comprises the steps of: (1) providing a mixture comprising one or more sources for $YO_2$, one or more sources for $X_2O_3$, and seed crystals having a CHA framework structure, wherein the CHA framework structure of the seed crystals comprises $YO_2$, $X_2O_3$, and optionally comprises $Z_2O_5$; and (2) crystallizing the mixture obtained in step (1); wherein Y is a tetravalent element, X is a trivalent element, and Z is a pentavalent element, wherein optionally one or more sources for $Z_2O_5$ are further provided in step (1), and wherein if the CHA framework structure of the seed crystals does not contain $Z_2O_5$, the seed crystals then have a $YO_2:X_2O_3$ molar ratio of 5 or greater than 5.

Another aspect of the invention relates to a synthetic organotemplate-free zeolitic material having a CHA-type framework structure, wherein the CHA framework structure comprises $YO_2$, $X_2O_3$, and optionally comprises $Z_2O_5$, wherein Y is a tetravalent element, X is a trivalent element, and Z is a pentavalent element, wherein said zeolitic material is non-calcined, and wherein if the CHA framework structure does not contain $Z_2O_5$, the CHA framework structure then has a $YO_2:X_2O_3$ molar ratio of 7 of greater than 7.

Yet another aspect of the invention relates to methods of using the synthetic organotemplate-free zeolitic materials described herein as a molecular sieve, an adsorbent, an ion-exchanger, a catalyst and/or a catalyst support.

BRIEF DESCRIPTION OF THE DRAWINGS

FIG. 1G shows the $^{27}Al$ MAS NMR spectrum of the crystalline product according to one or more embodiments of the invention;

FIG. 2B shows the $^{29}Si$ MAS NMR of the crystalline product obtained from a synthetic procedure according to one or more embodiments of the invention;

DETAILED DESCRIPTION

Figure 1A:
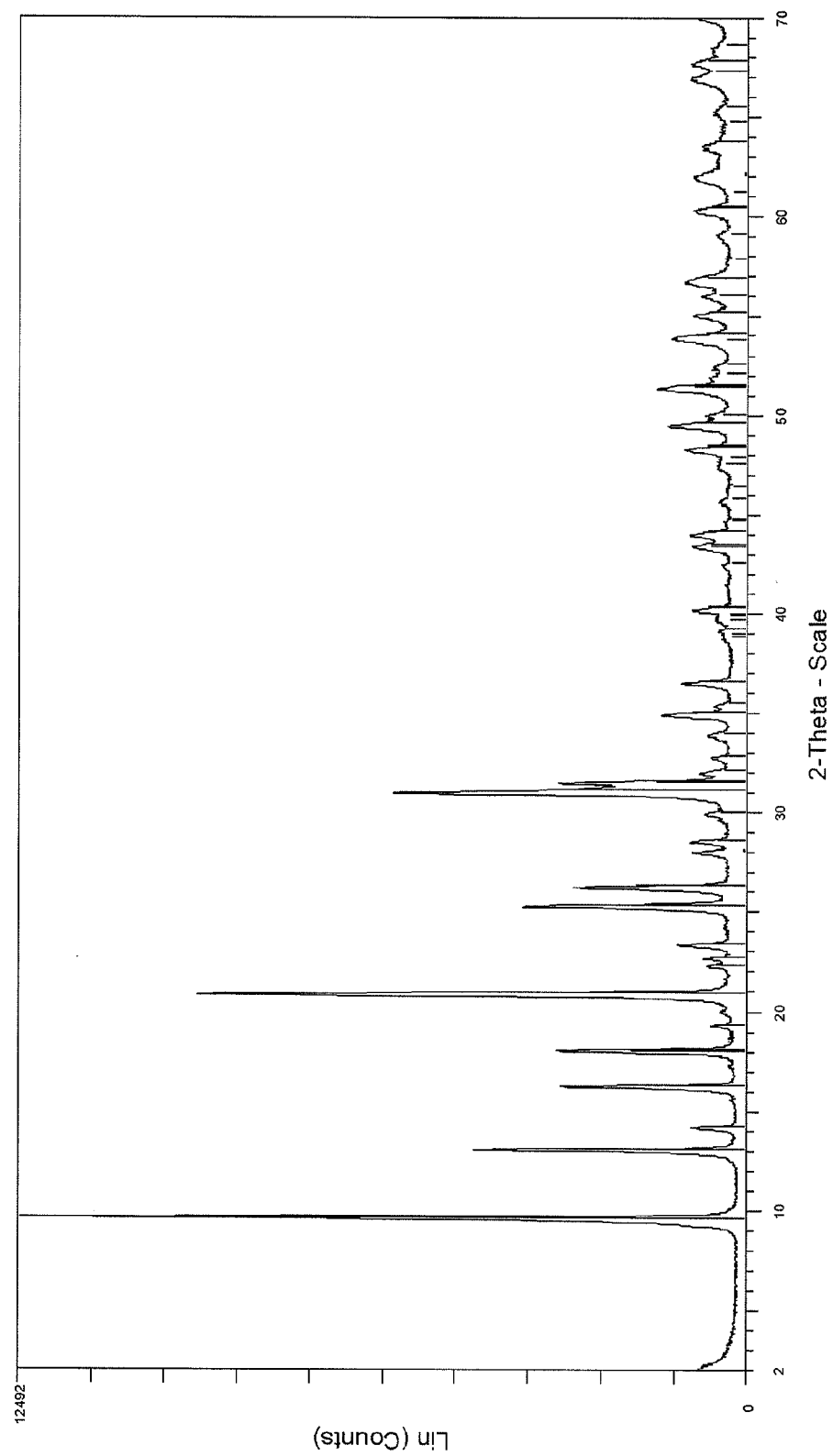
FIG. 1A shows the X-ray diffraction pattern of the sodium Chabazite seed crystals obtained from a hydrothermal synthesis according to one or more embodiments of the invention.

Accordingly, one or more aspects of the present invention provides a process for the organotemplate-free synthesis of a zeolitic material having a CHA-type framework structure adapted to a wide range of zeolitic seeding materials and products, in particular with respect to the $SiO_2:Al_2O_3$ molar ratios which may be obtained.

Furthermore, one or more aspects of the present invention provides a process for the production of an organotemplate-free zeolitic material having a CHA-type framework structure adapted to a wide range of zeolitic seeding materials and products which can be conducted under mild conditions and is non-destructive towards the zeolite architecture. In particular, one or more embodiments provides a process for the production of such materials which does not involve a high temperature calcination treatment or other treatment normally used for the removal of organotemplates present in the framework structure.

Some aspects of the present invention provide an improved and cost effective process for the production of organotemplate-free zeolitic materials having a CHA-type framework structure adapted to a wide range of zeolitic seeding materials and products, in particular with respect to crystallization time, energy consumption, and environmental pollution.

In addition to this, one or more aspects of the present invention to provide a wide range of synthetic organotemplate-free zeolitic materials having a CHA-type framework structure which have an intact architecture as directly obtained from the crystallization process.

Thus, it has surprisingly been found that according to the present invention a wide range of different zeolitic material having a CHA-type framework structure can be obtained without using an organotemplate in the synthesis thereof, in particular with respect to the $SiO_2:Al_2O_3$ molar ratios which may be achieved in the CHA framework structure. In particular, it has been found that when using seed crystals of a zeolitic material having a CHA-type framework structure in an organotemplate-free synthetic process, wherein said seed crystals display in particular intermediate to high $SiO_2:AlO_3$ molar ratios, a wide variety of organotemplate-free zeolitic materials having a CHA-type framework structure may be directly obtained which do not necessitate the cost- and time intensive procedures required for the removal of organotemplates normally used in their production. Thus, a one-pot synthetic procedure is provided for directly obtaining a wide range of organotemplate-free zeolitic materials having a CHA-type framework structure, wherein the porosity of said zeolitic material is directly given and must not first be provided by one or more post-synthetic treatments for removing structure directing agents from the crystallized framework, wherein the structure directing agents are typically organotemplates.

In addition to these considerable advantages, it has surprisingly been found that according to the inventive process, novel zeolitic materials having a CHA-type framework structure can be obtained displaying unprecedented properties which can be advantageously utilized in current and future applications. In particular, CHA-type frameworks are accessible of which the chemical composition and/or physical properties thereof may not be obtained by oraganotemplate-mediated synthesis. According to the present invention, such frameworks include in particular CHA-type frameworks with intermediate and high Si contents not achieved by the known synthetic methodologies. Such novel frameworks accessible by organotemplate-free synthesis are of considerable interest, in particular in catalytic applications or elsewhere for the trapping of organic molecules as well as in adsorption applications due to the intermediate to low density of acid sites and in particular of the aluminum functionalities which may be achieved therein.

Furthermore, due to the absence of organic materials in the reaction mixture which are prone to decomposition, low pressure apparatus may be used in the inventive process, wherein the materials used therein may be easily recycled due to the absence of organic waste products.

Thus, in view of the numerous surprising and considerable advantages mentioned in the foregoing, a highly efficient process is provided for the production of a wide variety of zeolitic materials having a CHA-type framework structure preferably displaying intermediate and high $SiO_2:Al_2O_3$ molar ratios, wherein said process involves considerably lower costs than organotemplate-mediated methodologies. This is not only due to the possibility of using simpler apparatus, in particular with respect to the amount of pressure they must withstand in synthesis. Far more, the novel process does not necessitate organotemplates, which are by far the most expensive components in organotemplate-mediated synthetic methodologies, in particular due to the fact that the expensive organotemplates may not be effectively recycled, but are rather destroyed in the course of providing the organotemplate-free product. Accordingly, the present invention surprisingly provides a process with highly reduced costs in view of the cheap raw materials, the simpler apparatus which may be used, and the highly reduced amount of waste products, thus affording a highly cost effective production process.

Therefore, the present invention relates to an organotemplate-free synthetic process for the production of a zeolitic material having a CHA-type framework structure comprising $YO_2$, $X_2O_3$, and optionally comprising $Z_2O_5$, wherein said process comprises the steps of:

(1) providing a mixture comprising one or more sources for $YO_2$, one or more sources for $X_2O_3$, and seed crystals having a CHA framework structure, wherein the CHA framework structure of the seed crystals comprises $YO_2$, $X_2O_3$, and optionally comprises $Z_2O_5$; and (2) crystallizing the mixture obtained in step (1);

wherein Y is a tetravalent element, X is a trivalent element, and Z is a pentavalent element, wherein optionally one or more sources for $Z_2O_5$ are further provided in step (1), and wherein if the CHA framework structure of the seed crystals does not contain $Z_2O_5$, the seed crystals then have a $YO_2:X_2O_3$ molar ratio of 5 or greater than 5, wherein the $YO_2:X_2O_3$ molar ratio preferably ranges from 5 to 200, more preferably from 6 to 150, more preferably from 8 to 100, more preferably from 12 to 70, more preferably from 20 to 50, more preferably from 25 to 40, more preferably from 28 to 35, and even more preferably from 29 to 33.

According to the inventive process, at no point does the mixture provided in step (1) and crystallized in step (2) contain more than an impurity of an organic structure directing agent specifically used in the synthesis of zeolitic materials having an CHA-type framework structure, in particular specific tetraalkylammonium compounds, dialkyl amines, heterocyclic amines, and combinations of two or more thereof. More preferably, the one or more structure directing agents comprise one or more compounds selected from the group consisting of tetra($C_1$-$C_5$)alkylammonium compounds, di($C_1$-$C_5$)alkyl amines, oxygen containing heteroxyclic amines with 5 to 8 ring members, and combinations of two or more thereof, more preferably from the group consisting of tetra($C_2$-$C_4$)alkylammonium compounds, di($C_2$-$C_4$)alkyl amines, oxygen containing heteroxyclic amines with 5 to 7 ring members, and combinations of two or more thereof, more preferably from the group consisting of tetra($C_2$-$C_3$)alkylammonium compounds, di($C_2$-$C_3$)alkyl amines, oxygen containing heteroxyclic amines with 5 or 6 ring members, and combinations of two or more thereof, and/or related organotemplates such as any suitable N-alkyl-3-quinuclidinol compound, N,N,N-trialkyl-exoaminonorbornane compound, N,N,N-trimethyl-1-adamantylammonium compound, N,N,N-trimethyl-2-adamantylammonium compound, N,N,N-trimethylcyclohexylammonium compound, N,N-dimethyl-3,3-dimethylpiperidinium compound, N,N-methylethyl-3,3-dimethylpiperidinium compound, N,N-dimethyl-2-methylpiperidinium compound, 1,3,3,6,6-pentamethyl-6-azonio-bicyclo(3.2.1)octane compound, N,N-dimethylcyclohexylamine compound, or any suitable N,N,N-trimethylbenzylammonium compound, including combinations of two or more thereof. Such an impurity can, for example, be caused by organic structure directing agents still present in seed crystals used in the inventive process. Organotemplates contained in seed crystal material may not, however, participate in the crystallization process since they are trapped within the seed crystal framework and therefore may not act structure directing agents within the meaning of the present invention.

Within the meaning of the present invention, an "organotemplate-free" synthetic process relates to a synthetic process wherein the materials used therein are substantially free of organotemplate materials, wherein "substantially" as employed in the present invention with respect to the amount of one or more organotemplates contained in the one or more materials used in a synthetic process indicates an amount of 0.1 wt.-% or less of one or more organotemplates, preferably 0.05 wt.-% or less, more preferably 0.001 wt.-% or less, more preferably 0.0005 wt.-% or less, and even more preferably 0.0001 wt.-% or less thereof. Said amounts of one or more organotemplates, if at all present an any one of the materials used in the synthetic process, may also be denoted as "impurities" or "trace amounts" within the meaning of the present invention. Furthermore, it is noted that the terms "organotemplate" and "organic structure directing agent" are synonymously used in the present application.

The term "organotemplate" as employed in the present application designates any conceivable organic material which is suitable for template-mediated synthesis of a zeolite material, preferably of a zeolite material having a CHA-type framework-structure, and even more preferably which is suitable for the synthesis of Chabazite. Such organotemplates include e.g. any suitable tetraalkylammonium compound, dialkyl amine, heterocyclic amine, N-alkyl-3-quinuclidinol compound, N,N,N-trialkyl-exoaminonorbornane compound, N,N,N-trimethyl-1-adamantylammonium compound, N,N,N-trimethyl-2-adamantylammonium compound, N,N,N-trimethylcyclohexylammonium compound, N,N-dimethyl-3,3-dimethylpiperidinium compound, N,N-methylethyl-3,3-dimethylpiperidinium compound, N,N-dimethyl-2-methylpiperidinium compound, 1,3,3,6,6-pentamethyl-6-azonio-bicyclo(3.2.1)octane compound, N,N-dimethylcyclohexylamine compound, and any suitable N,N,N-trimethylbenzylammonium compound.

Furthermore, within the meaning of the present invention, $YO_2$, $X_2O_3$, and optionally $Z_2O_5$ are comprised in the CHA-type framework structure as structure building elements, as opposed to non-framework elements which can be present in the pores and cavities formed by the framework structure and typical for zeolitic materials in general.

According to the present invention, a zeolitic material having a CHA-type framework structure is crystallized in step (2), wherein said material comprises $YO_2$. In principle, Y stands for any conceivable tetravalent element, Y standing for either or several tetravalent elements. Preferred tetravalent elements according to the present invention include Si, Sn, Ti, Zr, and Ge, and combinations thereof. More preferably, Y stands for Si, Ti, or Zr, or any combination of said tetravalent elements, even more preferably for Si, and/or Sn. According to the present invention, it is particularly preferred that Y stands for Si.

According to the inventive process, one or more sources for $YO_2$ are provided in step (1), wherein said one or more sources may be provided in any conceivable form provided that a zeolitic material having a CHA-type framework structure comprising $YO_2$ and $X_2O_3$ can be crystallized in step (2). Preferably, $YO_2$ is provided as such and/or as a compound which comprises $YO_2$ as a chemical moiety and/or as a compound which (partly or entirely) is chemically transformed to $YO_2$ during the inventive process. In preferred embodiments of the present invention, wherein Y stands for Si or for a combination of Si with one or more further tetravalent elements, the source for $SiO_2$ preferably provided in step (1) can also be any conceivable source. Thus, by way of example, any type of silicas and/or silicates may be used, wherein preferably the one or more sources for $YO_2$ comprises one or more silicates. As said one or more silicates, any conceivable silicate or a combination of silicates may be used wherein it is preferred that said one or more silicates comprise one or more alkaline metal silicates, the alkaline metal being preferably selected from the group consisting of Li, Na, K, Rb, and Cs. According to particularly preferred embodiments, the one or more silicates comprise one or more sodium and/or one or more potassium silicates, wherein even more preferably the one or more silicates comprise one or more sodium silicates.

Within the meaning of the present invention, the term "silicate" as a preferred source for $YO_2$ generally refers to any conceivable silicates, provided that an organotemplate-free zeolitic material having a CHA-type framework structure may be crystallized in step (2) of the inventive process. According to a particularly preferred meaning of the present invention, the term "silicate" refers to the $[SiO_3]^{2-}$ anion comprised in the particularly preferred silicate compounds comprised in the one or more sources for $YO_2$.

Thus, according to the present invention it is preferred that the one or more sources for $YO_2$ comprises one or more silicates, preferably one or more alkali metal silicates, wherein the alkali metal is preferably selected from the group consisting of Li, Na, K, Rb, and Cs, wherein more preferably the alkali metal is Na and/or K, and wherein even more preferably the alkali metal is Na.

According to particularly preferred embodiments of the present invention wherein the one or more sources for $YO_2$ provided in step (1) comprises one or more silicates, it is further preferred that said one or more silicates comprise water glass. In principle, any type of water glass or combinations thereof may be used in the present invention as the one or more sources for $YO_2$ provided that a zeolitic material having a CHA-type framework structure may be obtained, wherein preferably sodium and/or potassium silicate is employed as water glass, more preferably sodium silicate.

Therefore, according to particularly preferred embodiments of the present invention, the mixture provided in step (1) comprises water glass, preferably sodium and/or potassium silicate, and even more preferably sodium silicate.

According to said preferred embodiments of the present invention wherein the one or more sources for $YO_2$ comprises one or more silicates, it is further preferred that one or more silicas are added to the mixture provided in step (1) in addition to the one or more silicates. In principle, any conceivable source of silica may be employed, provided that a zeolitic material having the CHA-type framework structure may be crystallized in step (2). Thus, by way of example, any type of silica may be employed such as fumed silica, silica hydrosols, reactive amorphous silicas, silica gel, silicic acid, colloidal silica, pyrogenic silica, silicic acid esters, tetraalkoxy silanes, or mixtures of at least two of these compounds, wherein more preferably one or more silica hydrosols and/or one or more colloidal silicas are used, and even more preferably one or more colloidal silicas.

Thus, according to particular embodiments of the present invention which are yet further preferred, the mixture provided in step (1) of the inventive process further comprises one or more silicas in addition to the one or more silicates, preferably one or more silica hydrosols and/or one or more colloidal silicas, and even more preferably one or more colloidal silicas in addition to the one or more silicates.

According to the present invention, $X_2O_3$ is comprised in the zeolitic material having a CHA-type framework structure which is crystallized in step (2). In principle, X provided in step (1) in the one or more sources for $X_2O_3$ stands for any conceivable trivalent element, X standing for either one or several trivalent elements. Preferred trivalent elements according to the present invention include Al, B, In, and Ga, and combinations thereof. More preferably, X stands for Al, B, or In, or any combination of said trivalent elements, even more preferably for Al and/or B. According to the present invention, it is particularly preferred that X stands for Al.

In the process of the present invention, the one or more sources for $X_2O_3$ provided in step (1) may be provided in any conceivable form, provided that a zeolitic material having a CHA-type framework structure is crystallized in step (2). Preferably, $X_2O_3$ is provided as such and/or as a compound which comprises $X_2O_3$ as a chemical moiety and/or as a compound which (partly or entirely) is chemically transformed to $X_2O_3$ during the inventive process.

In more preferred embodiments of the present invention, wherein X stands for Al or for a combination of Al with one or more further trivalent elements, the source for $Al_2O_3$ provided in step (1) can be any conceivable source. There can be used for example any type of alumina and aluminates, aluminum salts such as, for example, alkali metal aluminates, aluminum alcoholates, such as, for example, aluminum triisopropylate, or hydrated alumina such as, for example, alumina trihydrate, or mixtures thereof. Preferably, the source for $Al_2O_3$ comprises at least one compound selected from the group consisting of alumina and aluminates, preferably aluminates, more preferably alkali metal aluminates, wherein even more preferably, the alkali metal of the aluminate comprises one or more of the alkali metals M. Among the preferred alkali metal aluminates, the at least one source preferably comprises sodium and/or potassium aluminate, more preferably sodium aluminate. In particularly preferred embodiments of the present invention, the source for $Al_2O_3$ is sodium aluminate.

Thus, according to preferred embodiments of the inventive process, the one or more sources for $X_2O_3$ comprises one or more aluminate salts, preferably one or more alkali metal aluminates, wherein the alkali metal is preferably selected from the group consisting of Li, Na, K, Rb, and Cs, wherein more preferably the alkali metal is Na and/or K, and wherein even more preferably the alkali metal is Na.

According to particularly preferred embodiments of the inventive process, the mixture according to step (1) comprises one or more silicates as a source for $YO_2$ and one or more aluminates as a source for $X_2O_3$, more preferably one or more alkali metal silicates and one or more alkali metal aluminates, more preferably a sodium and/or potassium silicate and a sodium and/or potassium aluminate, more preferably a sodium silicate and sodium aluminate, wherein even more preferably the one or more sources for $YO_2$ comprises sodium waterglass ($Na_2SiO_3$) and the one or more sources for $X_2O_3$ comprises sodium aluminate. According to alternatively particularly preferred embodiments of the present invention, the mixture according to step (1) comprises one or more silicas in addition to one or more silicates as a source for $YO_2$ and one or more aluminates as a source for $X_2O_3$, more preferably one or more colloidal silicas in addition to one or more alkali metal silicates and one or more alkali metal aluminates, more preferably one or more colloidal silicas in addition to a sodium and/or a potassium silicate and sodium and/or potassium aluminate, more preferably one or more colloidal silicas in addition to a sodium silicate and sodium aluminate, wherein even more preferably the one or more sources for $YO_2$ comprises one or more colloidal silicas in addition to sodium waterglass ($Na_2SiO_3$) and the one or more sources for $X_2O_3$ comprises sodium aluminate.

According to the inventive process, the mixture provided in step (1) optionally comprises one or more sources for $Z_2O_5$, wherein Z stands for any conceivable pentavalent element, Z standing for either one or several pentavalent elements. Preferably, $Z_2O_5$ is provided as such and/or as a compound which comprises $Z_2O_5$ as a chemical moiety and/or as a compound which (partly or entirely) is chemically transformed to $Z_2O_5$ during the inventive process. In principle, any conceivable source may be provided as the one or more sources for $Z_2O_5$, provided that in step (2) of the inventive process, a zeolitic material having a CHA-type framework structure is crystallized. Preferred pentavalent elements Z according to the present invention include P, As, Sb, Bi, V, Nb, Ta, and combinations of two or more thereof. More preferably, Z stands for P, As, V, and combinations of two or more thereof, wherein even more preferably Z comprises P or As. According to particularly preferred embodiments, Z comprises P, wherein it is particularly preferred that Z stands for P.

According to the inventive process, the mixture provided in step (1) comprises seed crystals having a CHA-type framework structure, wherein the CHA-type framework structure of the seed crystals comprises $YO_2$ and $X_2O_3$, and wherein if the CHA framework structure of the seed crystals does not contain $Z_2O_5$, said seed crystals then display a $YO_2:X_2O_3$ molar ratio of 5 or greater than 5. Thus, it has surprisingly been found that seed crystals having a CHA-type framework structure comprising $YO_2$ and $X_2O_3$, wherein the $YO_2:X_2O_3$ molar ratio is 5 or greater than 5, an organotemplate-free synthetic process may be provided for obtaining a zeolitic material having a CHA-type framework structure comprising $YO_2$ and $X_2O_3$, in particular in instances in which the CHA framework structure of the seed crystals does not contain $Z_2O_5$. In particular, as opposed to the prior art mentioned in the introductory section of the present application and which employ specific seed crystals obtained from inter-zeolitic transformation, said seed crystals being thus restricted to particular $YO_2:X_2O_3$ molar ratios due to the method of their production, the process of the present invention allows for the use of seed crystals displaying intermediate and high $YO_2:X_2O_3$ molar ratios. Within the meaning of the present invention, intermediate and high $YO_2:X_2O_3$ molar ratios generally refers to molar ratios having a value of 5 or greater than 5, and in particular to $YO_2:X_2O_3$ molar ratios according to particular and preferred embodiments of the present invention.

Thus, according to the present invention, the $YO_2:X_2O_3$ molar ratio of the seed crystals having a CHA-type framework structure provided in step (1) of the inventive process may display any conceivable $YO_2:X_2O_3$ molar ratio provided that said value is either 5 or a value greater than 5, and that a zeolitic material having a CHA-type framework structure may be crystallized in step (2) of the inventive process. Thus, by way of example, the seed crystals provided in step (1) of the inventive process may display a $YO_2:X_2O_3$ molar ratio in the range of anywhere from 5 to 200 wherein it is preferred that the molar ratio displayed by the seed crystals is comprised in the range of from 6 to 150, more preferably of from 8 to 100, more preferably of from 12 to 70, more preferably of from 20 to 50, more preferably of from 25 to 40, and even more preferably of from 28 to 35. According to particularly preferred embodiments of the present invention, the $YO_2:X_2O_3$ molar ratio of the seed crystals is in the range of from 29 to 33.

According to the present invention, the seed crystals having a CHA-type framework structure provided in step (1) of the inventive process may optionally comprise $Z_2O_5$. In said instances, the seed crystals having a CHA-type framework structure provided in step (1) of the inventive process display a $YO_2:nX_2O_3:pZ_2O_5$ molar ratio More specifically, according to said optional embodiments of the present invention wherein the CHA-type framework structure of the seed crystals further comprises $Z_2O_5$, said crystals are not necessarily characterized by a $YO_2:X_2O_3$ molar ratio but rather by a $YO_2:nX_2O_3:pZ_2O_5$ molar ratio wherein the value for the ratio $(1+2p):(n-p)$ is characteristic for the CHA-type framework structure of said seed crystals.

Thus, according to said embodiments of the present invention wherein the CHA-type framework structure of the seed crystals further comprises $Z_2O_5$, there is no particular restriction as to the $YO_2:X_2O_3$ molar ratio which the seed crystals further comprising $Z_2O_5$ may display. Thus, considering the value for the ratio $(1+2p):(n-p)$, said ratio may have any suitable value, provided that an organotemplate-free zeolitic material may be crystallized in step (2). Thus by way of example, the value for the ratio $(1+2p):(n-p)$ may be 1 or greater than 1, wherein it is preferred that said value is 2 or greater than 2, more preferably 3 or greater than 3, and even more preferably 5 or greater than 5. Thus, according to preferred embodiments of the inventive process, the value for the ratio $(1+2p):(n-p)$ of seed crystals further comprising $Z_2O_5$ may range anywhere from 1 to 500, more preferably from 2 to 400, more preferably from 3 to 300, more preferably from 5 to 200, more preferably from 6 to 150, more preferably from 8 to 100, more preferably from 12 to 70, more preferably from 20 to 50, more preferably from 25 to 40, and even more preferably from 28 to 35. and even more preferably from 29 to 33. According to particularly preferred optional embodiments of the present invention, the value for the ratio $(1+2p):(n-p)$ relative to the $YO_2:nX_2O_3:pZ_2O_5$ molar ratio of the seed crystals is comprised in the range of from 29 to 33.

Thus, according to preferred embodiments of the inventive process, the CHA framework structure of the seed crystals further comprises $Z_2O_5$ in addition to $YO_2$ and $X_2O_3$, the seed crystals then have a $YO_2:nX_2O_3:pZ_2O_5$ molar ratio, wherein the value for the ratio $(1+2p):(n-p)$ is 5 or greater than 5, wherein the value for the ratio $(1+2p):(n-p)$ preferably ranges from 5 to 200, more preferably from 6 to 150, more preferably from 8 to 100, more preferably from 12 to 70, more preferably from 20 to 50, more preferably from 25 to 40, more preferably from 28 to 35, and even more preferably from 29 to 33.

Regarding the composition of the seed crystals having a CHA framework structure, there is no particular restriction as to their composition, provided that they comprise $YO_2$ and $X_2O_3$, wherein Y is a tetravalent element and X is a trivalent element, and provided that they are suitable for crystallizing an organotemplate-free zeolitic material having a CHA-type framework structure in step (2) of the inventive process. As defined in the foregoing with respect to the inventive process, $YO_2$ and $X_2O_3$ comprised in the framework structure of the seed crystals having a CHA framework structure is contained therein as structure building elements, as opposed to non-framework elements which can be present in the pores and/or cavities formed by the CHA framework structure and typical for zeolitic materials in general.

In principle, the seed crystals having a CHA framework structure may comprise any conceivable tetravalent element Y, wherein Y stands for one or several tetravalent elements. Preferred tetravalent elements comprised in the seed crystals according to the present invention include Si, Sn, Ti, Zr, and Ge, and combinations of two or more thereof. More preferably, Y stands for Si, Ti, or Zr, or any combination of said tetravalent elements, even more preferably for Si and/or Sn. According to the present invention, it is particularly preferred that Y stands for Si.

According to the present invention it is further preferred that both said one or more sources for $YO_2$ and the seed crystals having a CHA framework structure provided in step (1) comprise the same one or more tetravalent elements, wherein even more preferably Y comprised in the one or more sources for $YO_2$ and Y comprised in the seed crystals having a CHA framework structure stand for the same one or more tetravalent elements according to particular and preferred embodiments of the present invention.

Furthermore, the seed crystals having a CHA framework structure may comprise any suitable trivalent element X, wherein again X stands for either one or several trivalent elements. Preferred trivalent elements according to the present invention include Al, B, In, and Ga, and combinations thereof. More preferably, X comprises Al or Ga, wherein more preferably X comprises Al, and wherein even more preferably X is Al.

As for the one or more tetravalent elements Y, it is further preferred according to the inventive process that both said one or more sources for $X_2O_3$ and the seed crystals having a CHA framework structure provided in step (1) comprise the same one or more trivalent elements X, wherein even more preferably X comprised in the one or more sources for $X_2O_3$ and X comprised in the seed crystals having a CHA framework structure stand for the same one or more trivalent elements according to particular and preferred embodiments of the present invention.

Finally, as regards the use of seed crystals optionally comprising $Z_2O_5$ in the inventive process, the CHA framework structure may accordingly comprise any suitable pentavalent element Z, wherein Z stands for either one of several pentavalent elements. Preferred pentavalent elements according to the present invention include P, As, Sb, Bi, V, Nb, Ta, and combinations of two or more thereof. More preferably Z comprises one or more pentavalent elements selected from the group consisting of P, As, V, and combinations of two or more thereof, wherein more preferably Z comprises P or As, preferably P, and wherein even more preferably Z is P According to particularly preferred embodiments, both said one or more sources for $YO_2$ and said one or more sources for $X_2O_3$ as well as the seed crystals having a CHA framework structure provided in step (1) comprise the same one or more tetravalent elements Y in addition to the same one or more trivalent elements X, wherein even more preferably Y comprised in the one or more sources for $YO_2$ and Y comprised in the seed crystals as well as X comprised in the one or more sources for $X_2O_3$ and X comprised in the seed crystals stand for the same one or more tetravalent elements and the same one or more trivalent elements, respectively, according to particular and preferred embodiments of the present invention.

According to the present invention, there is no particular restriction with respect to the amount of the one or more sources for $YO_2$ and the one or more sources for $X_2O_3$ provided in the mixture in step (1) of the inventive process provided that a zeolitic material having a CHA-type framework structure comprising $YO_2$ and $X_2O_3$ may be crystallized in step (2). Thus, in principle, any conceivable $YO_2$:$X_2O_3$ molar ratio may be provided in the mixture provided in step (1), wherein, by way of example, said molar ratio may range anywhere from 1 to 200. According to the present invention it is however preferred that the $YO_2$:$X_2O_3$ molar ratio of the mixture provided in step (1) is comprised in the range of from 2 to 150, and more preferably of from 5 to 100, more preferably of from 10 to 70, more preferably of from 15 to 50 and even more preferably of from 20 to 45. According to particularly preferred embodiments of the present invention, the $YO_2$:$X_2O_3$ molar ratio of the mixture provided in step (1) ranges from 25 to 42.

Therefore, it is preferred according to the present invention that the $YO_2$:$X_2O_3$ molar ratio of the mixture provided in step (1) ranges from 1 to 200, preferably from 2 to 150, more preferably from 5 to 100, more preferably from 10 to 70, more preferably from 15 to 50, more preferably from 20 to 45, and even more preferably from 25 to 42.

In the process of the present invention, the mixture provided in step (1) preferably comprises one or more alkaline metals M. In general, said one or more alkaline metals M may be provided from any suitable compounds or compounds comprising one or more alkaline metals M, wherein preferably the one or more alkaline metals M are provided as one or more alkaline metal salts. According to particularly preferred embodiments thereof, the one or more alkaline metals M are provided as one or more alkaline metal compounds being the one or more sources for $YO_2$ and/or the one or more sources for $X_2O_3$, even more preferably as one or more alkaline metal compounds being the respective sources for $YO_2$ and $X_2O_3$. According to said particularly and preferred embodiments, the one or more alkaline metal compounds used as sources for $YO_2$ and/or $X_2O_3$ preferably comprise one or more alkaline metal salts used as the one or more sources for $YO_2$ and/or $X_2O_3$ wherein according to a particularly preferred embodiment one or more alkaline metal salts are used as the one or more sources for $YO_2$ and/or $X_2O_3$, and preferably as the one or more sources for both $YO_2$ and $X_2O_3$.

As regards the one or more alkaline metals M preferably comprised in the mixture provided in step (1) of the inventive process, any suitable alkaline metal M or combination of alkaline metals M may be used, wherein preferably the one or more alkaline metals M are selected from the group consisting of Li, Na, K, Rb, and Cs, and combinations of two or more thereof, more preferably from the group consisting of Li, Na, Rb, and Cs, and combinations of two or more thereof. According to particularly preferred embodiments, the one or more alkaline metals M comprise Li and/or Na, and Na, wherein even more preferably the one or more alkaline metal is Li and/or Na, and preferably Na.

As regards the preferred embodiments of the inventive process wherein one or more alkaline metals M are provided in step (1), there is no particular restriction according to the present invention as to the amount of the one or more alkaline metals M which may be provided therein, provided that a zeolitic material having a CHA-type framework structure is crystallized in step (2). Thus, by way of example, the $M_2O$:$YO_2$ molar ratio of the mixture provided in step (1) according to said preferred embodiments may range anywhere from 0.01 to 5, wherein preferably said ratio ranges from 0.05 to 2, more preferably from 0.1 to 1.5, more preferably from 0.15 to 1, and even more preferably from 0.2 to 0.5. According to particularly preferred embodiments thereof, the $M_2O$:$YO_2$ molar ratio of the mixture provided in step (1) ranges from 0.25 to 0.35.

Furthermore, according to preferred embodiments of the inventive process wherein the mixture provided in step (1) comprises one or more alkaline metals M, there is also no particular restriction with respect to the $M_2O$:$X_2O_3$ molar ratio of the mixture, again provided that a zeolitic material having a CHA-type framework structure is crystallized in step (2). Same applies accordingly to the $YO_2$:$X_2O_3$:$M_2O_3$ molar ratios of said preferred mixtures comprising one or more alkaline metals M. Thus, by way of example, the $YO_2$:$X_2O_3$:$M_2O_3$ molar ratios of said preferred mixtures may range anywhere from (5-100):1:(0.5-50), wherein preferably the molar ratios are in the range of from (10-70):1:(1-30), more preferably of from (15-50):1:(2-20), and even more preferably from (20-45):1:(4-15). According to particularly preferred embodiments, the $YO_2$:$X_2O_3$:$M_2O_3$ molar ratios of the mixture provided in step (1) range from (25-42):1:(5-14).

According to alternatively preferred embodiments of the inventive process wherein the mixture provided in step (1) comprises one or more alkaline metals M, said mixture does not contain potassium and/or does not contain strontium. According to the present invention, a mixture defined as not containing potassium and/or strontium relates to a mixture wherein the amount of potassium and/or strontium contained therein is 0.001 wt.-% or less of potassium and/or strontium, preferably of 0.0005 wt.-% or less, more preferably of 0.00001 wt.-% or less, more preferably of 0.000005 wt.-% or less, and even more preferably 0.000001 wt.-% or less thereof. Said amounts of potassium and/or strontium, if at all present in the mixture provided in step (1), may also be denoted as "impurities" or "trace amounts" within the meaning of the present invention. According to particularly preferred embodiments of the present invention, the mixture provided in step (1) does not contain potassium.

Thus, according to preferred embodiments of the present invention, the mixture provided in step (1) contains no K and/or Sr, preferably no K.

According to the present invention, there is no particular restriction as to the CHA-type framework structure displayed by the seed crystals provided that said seed crystals display an X-ray diffraction pattern typical of a CHA framework structure in particular with respect to the reflections and their 2θ degree positions relative to one another. Thus, in principle, provided that the diffraction pattern is typical of a CHA-type framework structure, there is no particular restriction neither with respect to the actual position of the reflections measured as angle 2θ, nor with respect to the intensities of the individual reflections relative to one another. According to preferred embodiments of the present invention, however, the first reflection in the X-ray diffraction pattern of the seed crystals, i.e. the reflection having the lowest angle 2θ value is the reflection having highest intensity among all measured reflections, i.e. the reflection measured at the lowest diffraction angle 2θ has an intensity of 100%. Furthermore, when using Cu K(alpha 1) radiation, it is further preferred that the diffraction angle 2θ having an intensity of 100% is comprised in the range of from 5 to 15°

2θ, wherein more preferably, said most intense reflection is comprised in the range of from 8 to 12° 2θ, more preferably of from 9 to 10.5° 2θ, more preferably of from 9.2 to 10° 2θ, more preferably of from 9.5 to 9.7° 2θ, and even more preferably of from 9.55 to 9.65° 2θ. According to particularly preferred embodiments of the present invention, the most intense reflection in the diffraction pattern of the seed crystals having a CHA-type framework structure when using CU K(alpha 1) radiation is comprised in the range of from 9.58 to 9.62° 2θ.

According to the process of the present invention, seed crystals are provided in step (1), wherein said seed crystals comprise a zeolitic material having a CHA-type framework structure. In general, said seed crystals can comprise any zeolitic material having a CHA-type framework structure, provided that if the CHA framework structure of the seed crystals does not contain $Z_2O_5$, the framework structure has a $YO_2:X_2O_3$ molar ratio of 5 or greater than 5 or, and provided that a zeolitic material having a CHA-type framework structure is crystallized in step (2). Preferably, the zeolitic material having a CHA-type framework structure comprised in the seed crystals is a zeolitic material obtained according to the inventive process, and in particular according to any of the particular or preferred embodiments thereof described in the present application. More preferably, the zeolitic material having a CHA-type framework structure comprised in the seed crystals is the same as the zeolitic material having a CHA-type framework structure which is then crystallized in step (2). Particularly preferred according to the present invention are seed crystals comprising one or more zeolites selected from the group consisting of $(Ni(deta)_2)$-UT-6, Chabazite, |Li—Na| [Al—Si—O]-CHA, DAF-5, Na-Chabazite, K-Chabazite, LZ-218, Linde D, Linde R, MeAPSO-47, Phi, SAPO-34, SAPO-47, SSZ-13, SSZ-62, UiO-21, Willhendersonite, ZK-14, ZYT-6, and combinations of two or more thereof, preferably from the group consisting of Chabazite, |Li—Na| [Al—Si—O]-CHA, Na-Chabazite, K-Chabazite, SAPO-34, SAPO-47, SSZ-13, SSZ-62, and combinations of two or more thereof, more preferably from the group consisting of Chabazite, |Li—Na| [Al—Si—O]-CHA, Na-Chabazite, SAPO-34, SSZ-13, and combinations of two or more thereof, more preferably from the group consisting of Na-Chabazite, SAPO-34, SSZ-13, and combinations of two or more thereof, wherein even more preferably the seed crystals having a CHA framework structure comprise Na-Chabazite and/or SAPO-34, and preferably Na-Chabazite. According to further preferred embodiments of the present invention, the seed crystals provided in step (1) comprise one or more of the aforementioned particular and preferred zeolites, wherein said one or more zeolites have been obtained according to the inventive process.

According to the inventive process, any suitable amount of seed crystals can be provided in the mixture according to step (1), provided that a zeolitic material having a CHA-type framework structure is crystallized in step (2). It has, however, surprisingly been found that a zeolitic material having a CHA-type framework structure may be crystallized in step (2) using a low amount of seed crystals in the mixture according to step (1). In particular, as compared to Hasegawa and Li et al. discussed in the introductory portion of the present application, wherein very large amounts of seed crystal material is necessary for obtaining a zeolite membrane, it is possible according to the present invention to produce a greater amount of zeolitic material with a CHA-type framework structure compared to the amount of seed crystals provided in the mixture according to step (1). Thus, by way of example, an amount of seed crystals may be provided in the mixture according to step (1) ranging anywhere from 0.05 to 50 wt.-% based on 100 wt.-% of $YO_2$ in the one or more sources for $YO_2$ provided in step (1) for obtaining a zeolitic material with a CHA-type framework structure in step (2). According to the present invention it is however preferred that an amount of from 0.1 to 30 wt.-% of seed crystals is used, more preferably of from 0.5 to 20 wt.-%, more preferably of from 1 to 15 wt.-%, and even more preferably of from 5 to 12 wt.-%. According to a particularly preferred embodiment of the present invention, the amount of seed crystals in the mixture according to step (1) ranges from 9 to 11 wt.-% based on 100 wt.-% of $YO_2$ in the one or more sources for $YO_2$.

According to further embodiments of the present invention which are yet further preferred, it is possible to use even lower amounts of seed crystals in the mixture according to step (1), such that an amount of seed crystals is preferably provided in the mixture according to step (1) ranging from 0.05 to 30 wt.-% based on 100 wt.-% of $YO_2$ in the one or more sources for $YO_2$, and more preferably of from 0.1 to 15 wt.-%, more preferably of from 0.5 to 10 wt.-%, more preferably of from 1 to 8 wt.-% and even more preferably of from 3 to 6 wt.-%. According to said alternatively preferred embodiments, it is particularly preferred to provide an amount of seed crystals in the mixture according to step (1) in the range of from 4 to 5.5 wt.-% based on 100 wt.-% $YO_2$ in the one or more sources for $YO_2$.

According to the present invention, the mixture according to step (1) of the inventive process preferably further comprises one or more solvents. In this respect, any conceivable solvents may be used in any suitable amount, provided that a zeolitic material having a CHA-type framework structure comprising $YO_2$, $X_2O_3$, and optionally comprising $Z_2O_5$ can be obtained from crystallization in step (2). Thus, by way of example, the one or more solvents may be chosen from water, organic solvents, and mixtures thereof, preferably from the group consisting of distilled water, alcohols, and mixtures thereof. More preferably from the group consisting of distilled water, methanol, ethanol, propanol, and mixtures thereof. According to particularly preferred embodiments of the present invention, only water and preferably only distilled water is contained in the mixture according to step (1) as the solvent.

Therefore, according to preferred embodiments of the inventive process, the mixture according to step (1) comprises one or more solvents, wherein said one or more solvent preferably comprises water, more preferably distilled water.

As regards the one or more solvents which are preferably provided in the mixture according to step (1), any suitable amount thereof can be used. Thus, with respect to preferred embodiments wherein water and preferably distilled water is comprised in the mixture according to step (1) as a solvent, and wherein even more preferably only distilled water is contained in the mixture, the $H_2O:YO_2$ molar ratio of the mixture provided in step (1) may range anywhere from 1 to 150. According to said preferred embodiments, however, it is preferred that the $H_2O:YO_2$ molar ratio ranges from 3 to 100, more preferably from 5 to 50, more preferably from 10 to 30 and even more preferably from 15 to 25. According to particularly preferred embodiments of the present invention, wherein the mixture according to step (1) comprises water as a solvent, and even more preferably wherein distilled water is the only solvent present in said mixture, it is preferred that the $H_2O:YO_2$ molar ratio of the mixture according to step (1) ranges from 16 to 19.

In preferred embodiments of the process of the present invention, the mixture according to step (1) further comprises at one or more sources of one or more elements suitable for isomorphous substitution of at least a portion of the Y atoms and/or of the X atoms in the CHA-type framework structure. In general, any conceivable elements can be used provided that they may effectively be substituted into the CHA-type framework structure via isomorphous substitution. In preferred embodiments, the one or more elements are selected from the group consisting of B, Fe, Ti, Sn, Ga, Ge, Zr, V, Nb, Cu, Zn, Li, Be, and mixtures of two or more thereof, more preferably wherein the one or more elements are selected from the group consisting of B, Fe, Ti, Sn, Zr, Cu, and mixtures of two or more thereof, wherein even more preferably the one or more element is Fe and/or Cu, preferably Cu.

Therefore, the present invention therefore also provides a one-pot synthetic procedure for the preparation of an organotemplate-free zeolitic material having a CHA-type framework structure, preferably an organotemplate-free zeolitic material which is isomorphously substituted, wherein isomorphous substitution is not achieved by conventional processes involving the post-synthetic treatment of an existing framework, wherein post-framework elements are treated such that they may be replaced with other atoms which are then contained in the resulting framework structure. In particular, according to the inventive process it is not necessary to remove existing framework atoms for producing an isomorphously substituted framework structure.

In general, according to step (1) of the inventive process, the molar ratio of $YO_2$ to the element or to the sum of the one or more elements suitable for isomorphous substitution can have any conceivable value, wherein the molar ratio preferably ranges from 5 to 200, more preferably from 10 to 100, more preferably from 20 to 70, and even more preferably from 25 to 50.

In general, step (2) according to the inventive process can be conducted in any conceivable manner, provided that a zeolitic material having an CHA-type framework structure is crystallized from the mixture according to step (1). The mixture can be crystallized in any type of vessel, wherein a means of agitation is preferably employed, preferably by rotation of the vessel and/or stirring, and more preferably by stirring the mixture.

According to the inventive process, the mixture is preferably heated during at least a portion of the crystallization process in step (2). In general, the mixture can be heated to any conceivable temperature of crystallization, provided that a zeolitic material having a CHA-type framework structure is crystallized from the mixture. Preferably, the mixture is heated in step (2) to a temperature of crystallization ranging from 80 to 200° C., more preferably from 90 to 180° C., more preferably from 100 to 160° C., more preferably from 110 to 140° C., and even more preferably from 115 to 130° C.

In preferred embodiments of the present invention, the mixture according to step (1) is subjected in step (2) to a pressure which is elevated with regard to normal pressure. The term "normal pressure" as used in the context of the present invention relates to a pressure of 101, 325 Pa in the ideal case. However, this pressure may vary within boundaries known to the person skilled in the art. By way of example, this pressure can be in the range of from 95,000 to 106,000 or of from 96,000 to 105,000 or of from 97,000 to 104,000 or of from 98,000 to 103,000 or of from 99,000 to 102,000 Pa.

In preferred embodiments of the inventive process wherein a solvent is present in the mixture according to step (1), it is furthermore preferred that heating in step (2) is conducted under solvothermal conditions, meaning that the mixture is crystallized under autogenous pressure of the solvent which is used, for example by conducting heating in an autoclave or other crystallization vessel suited for generating solvothermal conditions. In particularly preferred embodiments wherein the solvent comprises water, preferably distilled water, heating in step (2) is accordingly preferably conducted under hydrothermal conditions.

The apparatus which can be used in the present invention for crystallization is not particularly restricted, provided that the desired parameters for the crystallization process can be realized, in particular with respect to the preferred embodiments requiring particular crystallization conditions. In the preferred embodiments conducted under solvothermal conditions, any type of autoclave or digestion vessel can be used.

In general, the duration of the crystallization process in step (2) of the inventive process is not particularly limited. In preferred embodiments involving heating of the mixture according to step (1), said crystallization process is conducted for a period ranging from 5 to 200 h, more preferably from 20 to 160 h, more preferably from 60 to 140 h, and even more preferably from 100 to 130 h According to preferred embodiments of the present invention, wherein the mixture is heated in step (2), said heating may be conducted during the entire crystallization process or during only one or more portions thereof, provided that a zeolitic material having the CHA-type framework structure is crystallized. Preferably, heating is conducted during the entire duration of crystallization.

In general, the process of the present invention can optionally comprise further steps for the work-up and/or further physical and/or chemical transformation of the zeolitic material having an CHA-type framework structure crystallized in step (2) from the mixture provided in step (1). The crystallized material can for example be subject to any sequence of isolation and/or washing procedures, wherein the zeolitic material obtained from crystallization in step (2) is preferably subject to at least one isolation and at least one washing procedure.

Isolation of the crystallized product can be achieved by any conceivable means. Preferably, isolation of the crystallized product can be achieved by means of filtration, ultrafiltration, diafiltration, centrifugation and/or decantation methods, wherein filtration methods can involve suction and/or pressure filtration steps.

With respect to one or more optional washing procedures, any conceivable solvent can be used. Washing agents which may be used are, for example, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred, distilled water being very particularly preferred as the only washing agent.

Preferably, the separated zeolitic material is washed until the pH of the washing agent, preferably the washwater, is in the range of from 6 to 8, preferably from 6.5 to 7.5, as determined via a standard glass electrode.

Furthermore, the inventive process can optionally comprise one or more drying steps. In general, any conceivable means of drying can be used. Drying procedures preferably include heating and/or applying vacuum to the zeolitic material having an CHA-type framework structure. In envisaged embodiments of the present invention, one or more drying steps may involve spray drying, preferably spray granulation of the zeolitic material.

In embodiments which comprise at least one drying step, the drying temperatures are preferably in the range of from 25° C. to 150° C., more preferably of from 60 to 140° C., more preferably of from 70 to 130° C. and even more preferably in the range of from 75 to 125° C. The durations of drying are preferably in the range of from 2 to 60 h, more preferably in the range of 6 to 48 hours, more preferably of from 12 to 36 h, and even more preferably of from 18 to 30 h.

According to the inventive process, the zeolitic material crystallized in step (2) can optionally be subject to at least one step of an ion-exchange procedure, wherein the term "ion-exchange" according to the present invention generally refers to non-framework ionic elements and/or molecules contained in the zeolitic material. Preferably, the non-framework ionic element comprises one or more of the one or more alkali metals M preferably comprised in the zeolitic material haven an CHA-type framework structure, more preferably Na and/or K, and even more preferably Na.

In general, any conceivable ion-exchange procedure with all possible ionic elements and/or molecules can be conducted on the zeolitic material, with the exception of organic structure directing agents specifically used in the synthesis of zeolitic materials having an CHA-type framework structure, in particular specific tetraalkylammonium compounds, dialkyl amines, heterocyclic amines, including combinations of two or more thereof, and/or related organotemplates such as any suitable N-alkyl-3-quinuclidinol compound, N,N,N-trialkyl-exoaminonorbornane compound, N,N,N-trimethyl-1-adamantylammonium compound, N,N,N-trimethyl-2-adamantylammonium compound, N,N,N-trimethylcyclohexylammonium compound, N,N-dimethyl-3,3-dimethylpiperidinium compound, N,N-methylethyl-3,3-dimethylpiperidinium compound, N,N-dimethyl-2-methylpiperidinium compound, 1,3,3,6,6-pentamethyl-6-azonio-bicyclo(3.2.1)octane compound, N,N-dimethylcyclohexylamine compound, or any suitable N,N,N-trimethylbenzylammonium compound, including combinations of two or more thereof. Preferably, as ionic elements at least one cation and/or cationic element is employed which is preferably selected from the group consisting of $H^+$, $NH_4^+$, Sr, Zr, Cr, Fe, Co, Ni, Cu, Zn, Ru, Rh, Pd, Ag, Os, Ir, Pt, Au, and mixtures of two or more thereof, more preferably from the group consisting of $H^+$, $NH_4^+$, Sr, Cr, Fe, Co, Ni, Cu, and mixtures of two or more thereof, and even more preferably from the group consisting of $H^+$, $NH_4^+$, Fe, Cu, and mixtures of two or more thereof. Preferably, the zeolitic material is first ion-exchanged with $H^+$ and/or $NH_4^+$, and more preferably with $NH_4^+$, before being subject to a further ion-exchange procedure, more preferably before being subject to ion-exchange with at least one cation and/or cationic element selected from the group consisting Sr, Zr, Cr, Fe, Co, Ni, Cu, Zn, Ru, Rh, Pd, Ag, Os, Ir, Pt, Au, and mixtures of two or more thereof, more preferably from the group consisting of Sr, Cr, Fe, Co, Ni, Cu, and mixtures of two or more thereof, wherein even more preferably the at least one cation and/or cationic element comprises or preferably consists of Cu and/or Fe, and preferably Cu.

In general, the optional washing and/or isolation and/or ion-exchange procedures comprised in the inventive process can be conducted in any conceivably order and repeated as often as desired.

Therefore, according to preferred embodiments of the present invention, the organotemplate-free synthetic process for the production of a zeolitic material having a CHA-type framework structure further comprises one or more of the following steps of (3) isolating the zeolitic material having a CHA-type framework structure, preferably by filtration,
and/or
(4) washing the zeolitic material having a CHA-type framework structure,
and/or
(5) drying the zeolitic material having a CHA-type framework structure,
and/or
(6) subjecting the zeolitic material having a CHA-type framework structure to an ion-exchange procedure,
wherein the steps (3) and/or (4) and/or (5) and/or (6) can be conducted in any order, and
wherein one or more of said steps is preferably repeated one or more times.

Furthermore, according to particularly preferred embodiments of the inventive process including at least one step (6) of subjecting the zeolitic material having a CHA-type framework structure to an ion-exchange procedure, it is further preferred that in the at least one step (6) at least one ionic non-framework element contained in the zeolitic material having a CHA-type framework is ion-exchanged, preferably against at least one cation and/or cationic element, wherein at least one cation and/or cationic element is preferably selected from the group consisting of $H^+$, $NH_4^+$, Sr, Zr, Cr, Fe, Co, Ni, Cu, Zn, Ru, Rh, Pd, Ag, Os, Ir, Pt, Au, and mixtures of two or more thereof, more preferably from the group consisting of $H^+$, $NH_4^+$, Sr, Cr, Fe, Co, Ni, Cu, and mixtures of two or more thereof, more preferably from the group consisting of $H^+$, $NH_4^+$, Fe, Cu, and mixtures of two or more thereof, wherein even more preferably the at least one cation and/or cationic element is Cu and/or Fe, and preferably Cu, wherein said at least one ionic non-framework element is preferably one or more alkali metals, preferably Na and/or K, and more preferably Na.

According to a further embodiment of the inventive process, the zeolitic material crystallized in step (2) is directly subject to at least one step of drying, preferably to spray drying and or spray granulation, without isolating, washing, or drying of the zeolitic material beforehand. Directly subjecting the mixture obtained from step (2) of the inventive process to a spray drying or spray granulation stage has the advantage that isolation and drying is performed in a single stage. Consequently, according to this embodiment of the present invention, an even more preferred process is provided wherein not only removal of organotemplate compounds is avoided, but also the number of post-synthesis workup steps is minimized, as a result of which the organotemplate-free zeolitic material having an CHA-type framework structure can be obtained from a highly simplified process.

According to a further embodiment of the present invention, the zeolitic material obtained from crystallization in step (2) is subject to at least one isolating step prior to being subject to at least one ion-exchange procedure, preferably to at least one isolating step followed by at least one washing step, and more preferably to at least one isolating step followed by at least one washing step followed by at least one drying step.

In the process of the present invention, it is preferred that a calcination step is not employed. In general, a calcination step involves the heating of the zeolitic material crystallized according to step (2) above a temperature of 500° C. More preferably, a process according to the present invention for the production of a zeolitic material having an CHA-type framework structure which does not comprise a calcination step refers to processes, wherein the zeolitic material crystallized according to step (2) is not subject in a subsequent step to a temperature exceeding 450° C., more preferably 350° C., more preferably 300° C., more preferably 250° C., more preferably 200° C., and even more preferably 150° C. According to the present invention it is particularly preferred that after completion of step (2) of the inventive process, wherein the crystallized zeolitic material is at ambient temperature, said material is subsequently not subject to any heating process normally or suitably conducted for removal of organotemplates form a zeolitic material having an CHA-type framework structure. Within the meaning of the present invention, a zeolitic material which is "non-calcined" is one which has not been subject to any one of the aforementioned calcination procedures.

In general, the zeolitic material having a CHA-type framework structure obtained according to the inventive process may be any conceivable zeolite of the CHA framework type comprising $YO_2$, $X_2O_3$, and optionally comprising $Z_2O_5$, wherein Y is a tetravalent element, X is a trivalent element, and Z is a pentavalent element.

The present invention furthermore relates to a synthetic organotemplate-free zeolitic material having a CHA-type framework structure which is either obtained by the process according to the present invention or by any conceivable process which leads to a zeolitic material having a CHA-type framework structure as obtainable according to the inventive process. According to particularly preferred embodiments, the synthetic organotemplate-free zeolitic material having a CHA-type framework structure is a non-calcined zeolitic material which is either obtained by the process according to the present invention or by any conceivable process which leads to a zeolitic material having a CHA-type framework structure as obtainable according to the inventive process. Within the meaning of the present invention, a material which is designated as a "synthetic" material does not signify that the designated material as such may not naturally occur in nature. In particular, a "synthetic" material only indicates that it is manmade but by no means excludes that the material as such may occur naturally. Therefore, by way of example, the present invention also relates to a synthetic Chabazite. In this respect, it is herewith further noted that within the meaning of the present invention, the term "organotemplate-free zeolitic material" is synonymous to "synthetic organotemplate-free zeolitic material".

Therefore, the present invention also relates to a synthetic organotemplate-free zeolitic material having a CHA-type framework structure which is obtainable and/or obtained according to the inventive process, and in particular according to the particular and preferred embodiments described in the present application.

Furthermore, the present invention also relates to a synthetic organotemplate-free zeolitic material as such having a CHA-type framework structure comprising $YO_2$, $X_2O_3$, and optionally comprising $Z_2O_5$, wherein said zeolitic material is non-calcined, and wherein if the CHA framework structure does not contain $Z_2O_5$, the CHA framework structure then has a $YO_2$:$X_2O_3$ molar ratio of 7 or greater than 7. Thus, it has surprisingly been found that as opposed to the prior art discussed in the introductory portion of the application, a synthetic organotemplate-free zeolitic material having a CHA-type framework structure comprising $YO_2$ and $X_2O_3$ may be obtained according to the present invention wherein the $YO_2$:$X_2O_3$ molar ratio may display intermediate and high values of 7 or greater. Furthermore, it has quite unexpectedly been found that a synthetic organotemplate-free zeolitic material having a CHA-type framework structure may be provided other than the very restricted structures and compositions currently provided in the art made possible by use of specific inter-zeolitic transformations.

According to preferred embodiments of the present invention wherein the CHA-type framework structure does not contain $Z_2O_5$, the $YO_2$:$X_2O_3$ molar ratio of the CHA framework structure ranges from 7 to 200, more preferably from 7.5 to 100, more preferably from 8 to 50, more preferably from 8.5 to 30, more preferably from 9 to 20, and even more preferably from 9.3 to 17. According to particularly preferred embodiments of the present invention, however, the $YO_2$:$X_2O_3$ molar ratio of the CHA framework structure ranges from 9.5 to 15.

According to specific embodiments of the present invention wherein the CHA framework structure of the synthetic organotemplate-free zeolitic material further comprises $Z_2O_5$ in addition to $YO_2$ and $X_2O_3$, there is, in general, no particular restriction as to the $YO_2$:$X_2O_3$ molar ratios displayed by such materials, such that the $YO_2$:$X_2O_3$ molar ratio in such inventive materials may have any conceivable value. According to particular embodiments of the present invention wherein the CHA-type framework structure further comprises $Z_2O_5$ in addition $YO_2$ and $X_2O_3$, the CHA-type framework structure then has a $YO_2$:$nX_2O_3$:$pZ_2O_5$ molar ratio, wherein the value for the ratio $(1+2p):(n-p)$ may have any conceivable value. Thus by way of example, the value for the ratio $(1+2p):(n-p)$ may be 1 or greater than 1, wherein it is preferred that said value is 2 or greater than 2, more preferably 3 or greater than 3, more preferably 5 or greater than 5, and even more preferably 7 or greater than 7. Thus, according to preferred embodiments of the inventive process, the value for the ratio $(1+2p):(n-p)$ of seed crystals further comprising $Z_2O_5$ may range anywhere from 1 to 500, more preferably from 2 to 400, more preferably from 3 to 300, more preferably from 5 to 250, more preferably from 7 to 200, more preferably from 7.5 to 100, more preferably from 8 to 50, more preferably from 8.5 to 30, more preferably from 9 to 20, more preferably from 9.3 to 17, and even more preferably from 9.5 to 15. According to an alternatively preferred embodiment wherein the CHA framework structure comprises $Z_2O_5$, the value for the ratio $(1+2p):(n-p)$ is in the range of from.

Within the meaning of the present invention, unless otherwise specified, the term "organotemplate-free zeolitic material" as used for referring to the organotemplate-free zeolitic material according to embodiments and preferred embodiments of the present invention designates both the organotemplate-free zeolitic material having a CHA-type framework structure which is obtainable and/or obtained according to the inventive process as well as the organotemplate-free zeolitic material as such having a CHA-type framework structure comprising $YO_2$, $X_2O_3$, and optionally comprising $Z_2O_5$, wherein Y is a tetravalent element, X is a trivalent element, and Z is a pentavalent element, wherein if the CHA framework structure does not contain $Z_2O_5$, the CHA framework structure then has a $YO_2:X_2O_3$ molar ratio of 7 or greater than 7, and wherein said zeolitic material is preferably non-calcined.

According to the present invention, there is no particular restriction as to the CHA-type framework structure displayed by the inventive materials, provided that the organotemplate-free zeolitic material having a CHA-type framework structure displays an X-ray diffraction pattern typical of a CHA framework structure in particular with respect to the reflections and their 2θ degree positions relative to one another. Thus, in principle, provided that the diffraction pattern is typical of a CHA-type framework structure, there is no particular restriction neither with respect to the actual position of the reflections measured as angle 2θ, nor with respect to the intensities of the individual reflections relative to one another. According to preferred embodiments of the present invention, however, the first reflection in the X-ray diffraction pattern of the zeolitic material having a CHA-type framework structure, i.e. the reflection having the lowest angle 2θ value is the reflection having highest intensity among all measured reflections, i.e. the reflection measured at the lowest diffraction angle 2θ has an intensity of 100%. Furthermore, when using Cu K(alpha 1) radiation, it is further preferred that the diffraction angle 2θ having an intensity of 100% is comprised in the range of from 5 to 15° 2θ, wherein more preferably, said most intense reflection is comprised in the range of from 8 to 12° 2θ, more preferably of from 9 to 10.5° 2θ, more preferably of from 9.2 to 10° 2θ, more preferably of from 9.5 to 9.7° 2θ, and even more preferably of from 9.55 to 9.65° 2θ. According to particularly preferred embodiments of the present invention, the most intense reflection in the diffraction pattern of the organotemplate-free zeolitic material having a CHA-type framework structure when using Cu K(alpha 1) radiation is comprised in the range of from 9.58 to 9.62° 2θ.

Therefore, according to preferred embodiments of the present invention, the CHA framework structure of the inventive zeolitic material displays an X-ray diffraction pattern wherein the most intense reflection having an intensity of 100% has a diffraction angle 2θ in the range of from 5 to 15, preferably of from 8 to 12, more preferably of from 9 to 10.5, more preferably of from 9.2 to 10, more preferably of from 9.5 to 9.7, more preferably of from 9.55 to 9.65, and even more preferably of from 9.58 to 9.62, wherein the diffraction angle 2θ is obtained using Cu K(alpha 1) radiation.

As regards the $^{29}Si$ MAS NMR of the inventive zeolitic material, there is no particular restriction as to the number and/or respective ppm values and/or relative intensities of the signals displayed in the NMR spectrum. According to preferred embodiments of the present invention, the $^{29}Si$ MAS NMR comprises a first peak (P1) comprised in the range of from −96 to −98.8 ppm, a second peak (P2) comprised in the range of from −102 to −104.5 ppm, and a third peak (P3) comprised in the range of from −109 to −111 ppm, wherein the integration of the first, second, and third peaks in the $^{29}Si$ MAS NMR of the zeolitic material offers a ratio of the integration values P1:P2:P3 of (0.35-0.55):1:(0.1-1.8). In particular, the signal at −109 ppm of the $^{29}Si$ MAS NMR corresponds to Q4 structures, wherein the respective signals at −103 and −98 ppm are attributed to the Q3 or to Q4 structures.

According to particularly preferred embodiments, the first peak (P1) in the $^{29}Si$ MAS NMR of the inventive zeolitic material is comprised in the range of from −96.5 to −98.5 ppm, more preferably of from −96.8 to −98.2 ppm, more preferably of from −97 to −98 ppm, and even more preferably of from −97.2 to −97.8 ppm. It is however particularly preferred according to the present invention that the first peak (P1) in the $^{29}Si$ MAS NMR is comprised in the range of from −97.4 to −97.6 ppm. Furthermore, the second peak (P2) in the $^{29}Si$ MAS NMR of the inventive zeolitic material is preferably comprised in the range of from −102.5 to −104 ppm, more preferably of from −102.8 to −103.7 ppm, and even more preferably of from −103 to −103.5 ppm, wherein according to particularly preferred embodiments the second peak (P2) is comprised in the range of from −103.2 to −103.4 ppm. Finally, it is further preferred that the third peak (P3) in the $^{29}Si$ MAS NMR of the inventive zeolitic material is comprised in the range of from −108.5 to −110.5 ppm, more preferably of from −109 to −110 ppm, more preferably of from −109.1 to −109.7 ppm, and even more preferably of from −109.2 to −109.6 ppm. According to particularly preferred embodiments, however, the third peak (P3) in the $^{29}Si$ MAS NMR is comprised in the range of from −109.3 to −109.5 ppm.

Furthermore, as to the integration of the first, second, and third peaks in the $^{29}Si$ MAS NMR of the zeolitic material offering a ratio of the integration values P1:P2:P3, according to particularly preferred embodiments, said ratio ranges from preferably from (0.4-0.5):1:(0.25-1.5), more preferably from (0.42-0.49):1:(0.4-1.2), more preferably from (0.43-0.48):1:(0.5-0.9), more preferably from (0.435-0.475):1:(0.55-0.7), and even more preferably from (0.45-0.47):1:(0.6-0.65). According to particularly preferred embodiments of the present invention, the ratio of the integration values P1:P2:P3 ranges from (0.455-0.465):1:(0.62-0.64).

As regards the $^{27}Al$ MAS NMR spectra of the inventive zeolitic materials having the CHA-type framework structure, there is again no particular restriction as to the number and/or respective ppm values and/or respective intensities of the signals which may be comprised in the NMR spectrum. According to preferred embodiments of the present invention, however, the $^{27}Al$ MAS NMR spectrum of the inventive materials comprises a peak (P' 1) comprised in the range of from −54.5 to −57.5 ppm. More specifically, the signal at around 55 ppm in the $^{27}Al$ MAS NMR spectrum corresponds to tetrahedrally coordinated Al sites. According the present invention it is further preferred that the peak (P' 1) in the $^{27}Al$ MAS NMR spectrum of the inventive materials is comprised in the range of from −55 to −57 ppm, more preferably of from −55.5 to −56.8 ppm, more preferably of from −55.7 to −56.5 ppm, and even more preferably of from −55.9 to −56.3 ppm. According to particularly preferred embodiments, the peak (P' 1) in the $^{27}Al$ MAS NMR spectrum of the inventive materials is comprised in the range of from −56 to −56.2 ppm.

There is no particular restriction according to the present invention as to the standard used in the $^{29}Si$ and $^{27}Al$ MAS NMR experiments for obtaining the respective values for the chemical shift in ppm in the $^{29}Si$ and $^{27}Al$ MAS NMR spectra according to particular and preferred embodiments of the present invention, wherein preferably an external standard is used. According to particularly preferred embodiments, the external standard used in the $^{29}Si$ MAS NMR experiment is the polymer Q8M8, wherein the resonance of the trimethylsilyl M group is set to 12.5 ppm. As regards the $^{27}Al$ MAS NMR experiment, on the other hand, an aqueous 1 M solution of $AlCl_3$ is used as an external zero reference. Thus, according to the present invention, the chemical shift values in ppm defined in the present application relative to the $^{29}Si$ and $^{27}Al$ MAS NMR spectra of the inventive zeolitic materials having a CHA-type framework structure are preferably based on the use of the polymer Q8M8 as an external secondary standard in the $^{29}$Si MAS NMR experiment, wherein the resonance of the trimethylsilyl M group is set to 12.5 ppm, as well as on the use of an aqueous 1M solution of AlCl$_3$ as an external zero reference in the $^{27}$Al MAS NMR experiment, respectively.

According to the present invention, the organotemplate-free zeolitic material having a CHA-type framework structure comprises YO$_2$. In principle, Y stands for any conceivable tetravalent element, Y standing for either or several tetravalent elements. Preferred tetravalent elements according to the present invention include Si, Sn, Ti, Zr, and Ge, and combinations thereof. More preferably, Y stands for Si, Ti, or Zr, or any combination of said tetravalent elements, even more preferably for Si, and/or Sn. According to the present invention, it is particularly preferred that Y stands for Si.

Furthermore, the organotemplate-free zeolitic material having a CHA-type framework structure comprises X$_2$O$_3$. Again, In principle, X stands for any conceivable trivalent element, X standing for one or several trivalent elements. Preferred trivalent elements according to the present invention include Al, B, In, and Ga, and combinations thereof. More preferably, X stands for Al, B, or In, or any combination of said trivalent elements, even more preferably for Al and/or B. According to the present invention, it is particularly preferred that X stands for Al.

Finally, according to the present invention, the organotemplate-free zeolitic material having a CHA-type framework structure optionally comprises Z$_2$O$_5$, wherein Z stands for any conceivable pentavalent element, Z standing for either one or several pentavalent elements. Preferred pentavalent elements Z according to the present invention include P, As, Sb, Bi, V, Nb, Ta, and combinations of two or more thereof. More preferably, Z stands for P, As, V, and combinations of two or more thereof, wherein even more preferably Z comprises P or As. According to particularly preferred embodiments, Z comprises P, wherein it is particularly preferred that Z stands for P Within the meaning of the present invention, an "organotemplate-free" zeolitic material relates to a zeolitic material which is substantially free of organotemplate materials, wherein "substantially" as employed in the present invention with respect to the amount of one or more organotemplates contained in the zeolitic material indicates an amount of 0.1 wt.-% or less of one or more organotemplates, preferably 0.05 wt.-% or less, more preferably 0.001 wt.-% or less, more preferably 0.0005 wt.-% or less, and even more preferably 0.0001 wt.- or less thereof. Said amounts of one or more organotemplates, if at all present in the zeolitic material, may also be denoted as "impurities" or "trace amounts" within the meaning of the present invention. Thus, according to the present invention, the zeolitic material does not contain more than an impurity of an organic structure directing agent specifically used in the synthesis of zeolitic materials having a CHA-type framework structure, in particular specific tetraalkyl ammonium salts and/or related organotemplates such as e.g. any suitable tetraalkylammonium compound, dialkyl amine, heterocyclic amine, N-alkyl-3-quinuclidinol compound, N,N,N-trialkyl-exoaminonorbornane compound, N,N,N-trimethyl-1-adamantylammonium compound, N,N,N-trimethyl-2-adamantylammonium compound, N,N,N-trimethylcyclohexylammonium compound, N,N-dimethyl-3,3-dimethylpiperidinium compound, N,N-methylethyl-3,3-dimethylpiperidinium compound, N,N-dimethyl-2-methylpiperidinium compound, 1,3,3,6,6-pentamethyl-6-azonio-bicyclo(3.2.1)octane compound, N,N-dimethylcyclohexylamine compound, and any suitable N,N,N-trimethylbenzylammonium compound. Such an impurity can, for example, be caused by organic structure directing agents still present in seed crystals used in the inventive process or in any other process by which the zeolitic material according to the present invention may be obtained.

According to the present invention, the synthetic organotemplate-free zeolitic material having a CHA-type framework is preferably non-calcined, wherein, with the exception of the conditions in which it is crystallized, the zeolitic material having a CHA-type framework structure according to the present invention has not been subject to a heating process normally or suitably conducted for removal of organotemplates from a zeolitic material having a CHA-type framework structure.

According to the present invention, the inventive zeolitic materials having a CHA-type framework structure may contain extra-framework ions, wherein preferably said ions contain one or more metals, more preferably one or more alkaline metals M. According to preferred embodiments containing one or more alkaline metals M, it is further preferred that said one or more metals are selected from the group consisting of Li, Na, K, Rb, and Cs, and combinations of two or more thereof, wherein more preferably M is Na and/or K, and wherein even more preferably M is Na.

Furthermore, according to preferred embodiments of the present invention, wherein the organotemplate-free zeolitic material comprises one or more alkaline metals M as non-framework elements, the molar ratio M:X$_2$O$_3$ preferably ranges from 0.05 to 10, more preferably from 0.1 to 7, more preferably from 0.5 to 5, more preferably from 1 to 3.5, more preferably from 1.5 to 3, and even more preferably from 1.8 to 2.8.

According to the present invention it is further preferred that when the organotemplate-free zeolitic material comprises one or more alkaline metals M as non-framework elements. There is no particular restriction according to the present invention as to the particular amount of alkaline metal M which may be contained as non-framework element in the zeolitic material. Thus, in principle, the molar ratio M:X$_2$O$_3$ may have any conceivable value. Accordingly by way of example, the M:X$_2$O$_3$ molar ratio may range anywhere from 0.05 to 10, wherein it is preferred that the M:X$_2$O$_3$ molar ratio ranges from 0.1 to 7, more preferably from 0.5 to 5, more preferably from 1 to 3.5, more preferably from 1.5 to 3, and even more preferably from 1.8 to 2.8.

According to preferred embodiments, at least a portion of the alkaline metals M optionally present in the zeolitic material having a CHA-type framework structure are substituted by one or more cation and/or cationic element. In general, any cation and/or cationic element may substitute the alkaline metals M, wherein cations and/or cationic elements are preferred which are suited for ion exchange in the zeolitic material, with the exception of organic structure directing agents specifically used in the synthesis of zeolitic materials having a CHA-type framework structure, in particular specific tetraalkyl ammonium compounds, dialkyl amines, heterocyclic amines, N-alkyl-3-quinuclidinol compounds, N,N,N-trialkyl-exoaminonorbornane compounds, N,N,N-trimethyl-1-adamantylammonium compounds, N,N,N-trimethyl-2-adamantylammonium compounds, N,N,N-trimethylcyclohexylammonium compounds, N,N-dimethyl-3,3-dimethylpiperidinium compounds, N,N-methylethyl-3,3-dimethylpiperidinium compounds, N,N-dimethyl-2-methylpiperidinium compounds, 1,3,3,6,6-pentamethyl-6-azonio-bicyclo(3.2.1)octane compounds, N,N- dimethylcyclohexylamine compounds, and N,N,N-trimethylbenzylammonium compounds.

Preferably, the one or more cation and/or cationic element is selected from the group consisting of $H^+$, $NH_4^+$, Sr, Zr, Cr, Fe, Co, Ni, Cu, Zn, Ru, Rh, Pd, Ag, Os, Ir, Pt, Au, and mixtures of two or more thereof, more preferably from the group consisting of $H^+$, $NH_4^+$, Sr, Cr, Fe, Co, Ni, Cu, and mixtures of two or more thereof, more preferably from the group consisting of $H^+$, $NH_4^+$, Fe, Cu, and mixtures of two or more thereof, and even more preferably wherein at least a portion of the alkali metal atoms M is substituted by Fe and/or Cu, preferably by Cu.

According to preferred embodiments of the present invention, at least a portion of the Y atoms in the CHA-type framework is isomorphously substituted by one or more element. In general, Y can be isomorphously substituted by any suitable element, wherein the one or more element is preferably selected from the group consisting of B, Fe, Ti, Sn, Ga, Ge, Zr, V, Nb, Cu, Zn, Li, Be, and mixtures of two or more thereof, more preferably wherein the one or more elements are selected from the group consisting of B, Fe, Ti, Sn, Zr, Cu, and mixtures of two or more thereof, wherein even more preferably the one or more element is Fe and/or Cu, preferably Cu.

In general, there is no particular restriction according to the present invention as to the portion of Y atoms which may be isomorphously substituted in the CHA-type framework of the preferred organotemplate-free zeolitic material. According to preferred embodiments, the molar ratio of $YO_2$ to the one or more element ranges from 5 to 100, preferably from 10 to 80, more preferably from 20 to 60, and even more preferably from 25 to 50.

Therefore, as described above, the organotemplate-free zeolitic material according to the present invention may comprise one or more of any zeolites having a CHA-type framework structure, provided that said framework structure comprises $YO_2$ and $X_2O_3$, and that if the CHA framework does not contain $Z_2O_5$, the CHA framework structure then has a $YO_2:X_2O_3$ molar ratio of 7 or greater than 7. According to preferred embodiments of the present invention, the organotemplate-free zeolitic material comprises one or more zeolites selected from the group consisting of (Ni(deta)$_2$)-UT-6, Chabazite, |Li—Na| [Al—Si—O]-CHA, DAF-5, Na-Chabazite, K-Chabazite, LZ-218, Linde D, Linde R, MeAPSO-47, Phi, SAPO-34, SAPO-47, SSZ-13, SSZ-62, UiO-21, Willhendersonite, ZK-14, ZYT-6, preferably from the group consisting of Chabazite, |Li—Na| [Al—Si—O]-CHA, Na-Chabazite, K-Chabazite, SAPO-34, SAPO-47, SSZ-13, SSZ-62, and combinations of two or more thereof, more preferably from the group consisting of Chabazite, |Li—Na| [Al—Si—O]-CHA, Na-Chabazite, SAPO-34, SSZ-13, and combinations of two or more thereof, more preferably from the group consisting of Na-Chabazite, SAPO-34, SSZ-13, and combinations of two or more thereof, wherein even more preferably the seed crystals having a CHA framework structure comprise Na-Chabazite and/or SAPO-34, and preferably Na-Chabazite.

Depending on the specific needs of its application, the zeolitic material of the present invention can be employed as such, like in the form of a powder, a spray powder or a spray granulate obtained from above-described separation techniques, e.g. decantation, filtration, centrifugation, or spraying.

In many industrial applications, it is often desired on the part of the user not to employ the zeolitic material as powder or sprayed material, i.e. the zeolitic material obtained by the separation of the material from its mother liquor, optionally including washing and drying, and subsequent calcination, but a zeolitic material which is further processed to give moldings. Such moldings are required particularly in many industrial processes, e.g. in many processes wherein the zeolitic material of the present invention is employed as catalyst or adsorbent.

Accordingly, the present invention also relates to a molding comprising the inventive zeolitic material.

In general, the powder or sprayed material can be shaped without any other compounds, e.g. by suitable compacting, to obtain moldings of a desired geometry, e.g. tablets, cylinders, spheres, or the like.

Preferably, the powder or sprayed material is admixed with or coated by a suitable refractory binder. In general, suitable binders are all compounds which impart adhesion and/or cohesion between the zeolitic material particles to be bonded which goes beyond the physisorption which may be present without a binder. Examples of such binders are metal oxides, such as, for example, $SiO_2$, $Al_2O_3$, $TiO_2$, $ZrO_2$ or MgO or clays, or mixtures of two or more of these compounds. Naturally occurring clays which can be employed include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. In addition, the zeolitic material according to the present invention can be composited with a porous matrix material such as silica-alumina, silica-magnesia, silica-zirconia, silica-thoria, silica-beryllia and silica-titania as well as ternary compositions such as silica-alumina-thoria, silica-alumina-zirconia, silica-alumina-magnesia and silica-magnesia-zirconia.

The zeolitic material of the present invention may therefore also be provided in the form of extrudates, pellets, tablets or particles of any other suitable shape, for use as a packed bed of particulate catalyst, or as shaped pieces such as plates, saddles, tubes, or the like.

Also preferably, the powder or the sprayed material, optionally after admixing or coating by a suitable refractory binder as described above, is formed into a slurry, for example with water, which is deposited upon a suitable refractory carrier. The slurry may also comprise other compounds such as, e.g., stabilizers, defoamers, promoters, or the like. Typically, the carrier comprises a member, often referred to as a "honeycomb" carrier, comprising one or more refractory bodies having a plurality of fine, parallel gas flow passages extending there through. Such carriers are well known in the art and may be made of any suitable material such as cordierite or the like.

In general, the zeolitic material described above can be used as molecular sieve, adsorbent, catalyst, catalyst support or binder thereof. For example, the zeolitic material can be used as molecular sieve to dry gases or liquids, for selective molecular separation, e.g. for the separation of hydrocarbons or amines; as ion exchanger; as chemical carrier; as adsorbent, in particular as adsorbent for the separation of hydrocarbons or amines; or as a catalyst. Most preferably, the zeolitic material according to the present invention is used as a catalyst and/or as a catalyst support.

According to a preferred embodiment of the present invention, the zeolitic material of the invention is used in a catalytic process, preferably as a catalyst and/or catalyst support, and more preferably as a catalyst. In general, the zeolitic material of the invention can be used as a catalyst and/or catalyst support in any conceivable catalytic process, wherein processes involving the conversion of at least one organic compound is preferred, more preferably of organic compounds comprising at least one carbon—carbon and/or carbon—oxygen and/or carbon—nitrogen bond, more preferably of organic compounds comprising at least one carbon—carbon and/or carbon—oxygen bond, and even more preferably of organic compounds comprising at least one carbon—carbon bond. In particularly preferred embodiments of the present invention, the zeolitic material is used as a catalyst and/or catalyst support in a fluid catalytic cracking (FCC) process.

Furthermore, it is preferred according to the present invention, that the zeolitic material is used as a catalyst for producing light olefins from non-petroleum feedstock by conversion of oxygenates, such as lower alcohols (methanol, ethanol), ethers (dimethyl ether, methyl ethyl ether), esters (dimethyl carbonate, methyl formate) and the like to olefins, and especially in the conversion of lower alcohols to light olefins. According to particularly preferred embodiments, the zeolitic material of the present invention is used in the conversion of methanol to olefin (MTO)

According to a further embodiment of the present invention, the zeolitic material of the invention is preferably used in a catalytic process involving the conversion of at least one compound comprising at least one nitrogen—oxygen bond. Particularly preferred according to the present invention is the use of the zeolitic material as a catalyst and/or catalyst support in a selective catalytic reduction (SCR) process for the selective reduction of nitrogen oxides $NO_x$; for the oxidation of $NH_3$, in particular for the oxidation of $NH_3$ slip in diesel systems; for the decomposition of $N_2O$. The term nitrogen oxides, $NO_x$, as used in the context of the present invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$). According to particularly preferred embodiments of the present invention, the zeolitic material used in a catalytic process involving the conversion of at least one compound comprising at least one nitrogen—oxygen bond comprises Cu and/or Fe, and more preferably Cu.

Therefore, the present invention also relates to a method for selectively reducing nitrogen oxides $NO_x$ by contacting a stream containing $NO_x$ with a catalyst containing the zeolitic material according to the present invention under suitable reducing conditions; to a method of oxidizing $NH_3$, in particular of oxidizing $NH_3$ slip in diesel systems, by contacting a stream containing $NH_3$ with a catalyst containing the zeolitic material according to the present invention under suitable oxidizing conditions; to a method of decomposing of $N_2O$ by contacting a stream containing $N_2O$ with a catalyst containing the zeolitic material according to the present invention under suitable decomposition conditions; to a method of controlling emissions in Advanced Emission Systems such as Homogeneous Charge Compression Ignition (HCCI) engines by contacting an emission stream with a catalyst containing the zeolitic material according to the present invention under suitable conditions; to a fluid catalytic cracking FCC process wherein the zeolitic material according to the present invention is employed as additive; to a method of converting an organic compound by contacting said compound with a catalyst containing the zeolitic material according to the present invention under suitable conversion conditions; to a "stationary source" process wherein a catalyst is employed containing the zeolitic material according to the present invention.

Therefore, the present invention also relates to a method for selectively reducing nitrogen oxides $NO_x$, wherein a gaseous stream containing nitrogen oxides $NO_x$, preferably also containing ammonia and/urea, is contacted with the zeolitic material according to the present invention or the zeolitic material obtainable or obtained according to the present invention, preferably in the form of a molded catalyst, still more preferably as a molded catalyst wherein the zeolitic material is deposited on a suitable refractory carrier, still more preferably on a "honeycomb" carrier.

The nitrogen oxides which are reduced using a catalyst containing the zeolitic material according to the present invention or the zeolitic material obtainable or obtained according to the present invention may be obtained by any process, e.g. as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogenous materials may be mentioned.

Most preferably, the zeolitic material according to the present invention or the zeolitic material obtainable or obtained according to the present invention is used as a molded catalyst, still more preferably as a molded catalyst wherein the zeolitic material is deposited on a suitable refractory carrier, still more preferably on a "honeycomb" carrier, for the selective reduction of nitrogen oxides $NO_x$, i.e. for selective catalytic reduction of nitrogen oxides. In particular, the selective reduction of nitrogen oxides wherein the zeolitic material according to the present invention is employed as catalytically active material is carried out in the presence ammonia or urea. While ammonia is the reducing agent of choice for stationary power plants, urea is the reducing agent of choice for mobile SCR systems. Typically, the SCR system is integrated in the engine and vehicle design and, also typically, contains the following main components: SCR catalyst containing the zeolitic material according to the present invention; a urea storage tank; a urea pump; a urea dosing system; a urea injector/nozzle; and a respective control unit.

Furthermore, it is preferred according to the present invention that the zeolitic material is used as a molecular trap for organic compounds. In general, any type of organic compound may be trapped in the zeolitic material, wherein it is preferred that the compound is reversibly trapped, such that it may be later released from the zeolitic material, preferably wherein the organic compound is released—preferably without conversion thereof—by an increase in temperature and/or a decrease in pressure. Furthermore, it is preferred that the zeolitic material is used to trap organic compounds of which the dimensions allow them to penetrate the microporous system of the molecular structure. According to yet further embodiments of the present invention, it is preferred that the trapped compounds are released under at least partial conversion thereof to a chemical derivative and/or to a decomposition product thereof, preferably to a thermal decomposition product thereof.

When preparing specific catalytic compositions or compositions for different purposes, it is also conceivable to blend the zeolitic material according to the present invention with at least one other catalytically active material or a material being active with respect to the intended purpose. It is also possible to blend at least two different inventive materials which may differ in their $YO_2:X_2O_3$ molar ratio, or as the case may be given in their $YO_2:X_2O_3:Z_2O_5$ molar ratio when the two or more different materials contain $Z_2O_5$, Z preferably being phosphorous, wherein the two different inventive materials even more preferably in their $SiO_2$:

Al$_2$O$_3$ and/or SiO$_2$:Al$_2$O$_3$:P$_2$O$_5$ molar ratio, and/or in the presence or absence of one or more further metals such as one or more transition metals and/or in the specific amounts of a further metal such as a transition metal, wherein according to particularly preferred embodiments, the one or more transition metal comprises Cu and/or Fe, more preferably Cu. It is also possible to blend at least two different inventive materials with at least one other catalytically active material or a material being active with respect to the intended purpose.

Also, the catalyst may be disposed on a substrate. The substrate may be any of those materials typically used for preparing catalysts, and will usually comprise a ceramic or metal honeycomb structure. Any suitable substrate may be employed, such as a monolithic substrate of the type having fine, parallel gas flow passages extending there through from an inlet or an outlet face of the substrate, such that passages are open to fluid flow there through (referred to as honeycomb flow through substrates). The passages, which are essentially straight paths from their fluid inlet to their fluid outlet, are defined by walls on which the catalytic material is disposed as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 400 or more gas inlet openings (i.e., cells) per square inch (2.54 cm×2.54 cm) of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). The catalyst composition can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alpha-alumina, an aluminosilicate, and the like.

The substrates useful for the catalysts of embodiments of the present invention may also be metallic in nature and be composed of one or more metals or metal alloys. The metallic substrates may be employed in various shapes such as corrugated sheet or monolithic form.

Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium, and the like. The surface or the metal substrates may be oxidized at high temperatures, e.g., 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate.

In alternative embodiments, zeolitic material according to the present invention may be deposited on an open cell foam substrate. Such substrates are well known in the art, and are typically formed of refractory ceramic or metallic materials.

Especially preferred is the use of a catalyst containing the zeolitic material according to the present invention or the zeolitic material obtainable or obtained according to the present invention for removal of nitrogen oxides NO$_x$ from exhaust gases of internal combustion engines, in particular diesel engines, which operate at combustion conditions with air in excess of that required for stoichiometric combustion, i.e., lean.

Therefore, the present invention also relates to a method for removing nitrogen oxides NO$_x$ from exhaust gases of internal combustion engines, in particular diesel engines, which operate at combustion conditions with air in excess of that required for stoichiometric combustion, i.e., at lean conditions, wherein a catalyst containing the zeolitic material according to the present invention or the zeolitic material obtainable or obtained according to the present invention is employed as catalytically active material.

The present invention therefore relates to the use of the zeolitic material of the invention, in particular in the field of catalysis and/or in the treatment of exhaust gas, wherein said exhaust gas treatment comprises industrial and automotive exhaust gas treatment. In these and other applications, the zeolitic material of the present invention can by way of example be used as a molecular sieve, catalyst, and/or catalyst support.

In embodiments of the present invention involving the use of the zeolitic material of the invention in exhaust gas treatment, the zeolitic material is preferably used in the treatment of industrial or automotive exhaust gas, more preferably as a molecular sieve in said applications. In a particularly preferred embodiment, the zeolitic material used in exhaust gas treatment is comprised in a hydrocarbon trap.

Therefore, the present invention further relates to the use of a zeolitic material according to the present invention, and in particular according to preferred and particularly preferred embodiments thereof as defined in the present application, as a molecular sieve, as an adsorbent, for ion-exchange, as a catalyst and/or as a catalyst support, preferably as a catalyst for the selective catalytic reduction (SCR) of nitrogen oxides NO$_x$; for the oxidation of NH$_3$, in particular for the oxidation of NH$_3$ slip in diesel systems; for the decomposition of N$_2$O; as an additive in fluid catalytic cracking (FCC) processes; and/or as a catalyst in organic conversion reactions, preferably in the conversion of alcohols to olefins, and more preferably in methanol to olefin (MTO) catalysis. According to the present invention it is however particular preferred that the organotemplate-free zeolitic material having a CHA-type framework structure is used as a catalyst for the selective catalytic reduction (SCR) of nitrogen oxides NO$_x$.

The present invention includes the following embodiments, wherein these include the specific combinations of embodiments as indicated by the respective interdependencies defined therein:

1. An organotemplate-free synthetic process for the production of a zeolitic material having a CHA-type framework structure comprising YO$_2$, X$_2$O$_3$, and optionally comprising Z$_2$O$_5$, wherein said process comprises the steps of:

(1) providing a mixture comprising one or more sources for $YO_2$, one or more sources for $X_2O_3$, and seed crystals having a CHA framework structure, wherein the CHA framework structure of the seed crystals comprises $YO_2$, $X_2O_3$, and optionally comprises $Z_2O_5$; and (2) crystallizing the mixture obtained in step (1);

wherein Y is a tetravalent element, X is a trivalent element, and Z is a pentavalent element, wherein optionally one or more sources for $Z_2O_5$ are further provided in step (1), and wherein if the CHA framework structure of the seed crystals does not contain $Z_2O_5$, the seed crystals then have a $YO_2:X_2O_3$ molar ratio of 5 or greater than 5, wherein the $YO_2:X_2O_3$ molar ratio preferably ranges from 5 to 200, more preferably from 6 to 150, more preferably from 8 to 100, more preferably from 12 to 70, more preferably from 20 to 50, more preferably from 25 to 40, more preferably from 28 to 35, and even more preferably from 29 to 33.

2. The process of embodiment 1, wherein if the CHA framework structure of the seed crystals further comprises $Z_2O_5$ in addition to $YO_2$ and $X_2O_3$, the seed crystals then have a $YO_2:nX_2O_3:pZ_2O_5$ molar ratio, wherein the value for the ratio $(1+2p):(n-p)$ is 5 or greater than 5, wherein the value for the ratio $(1+2p):(n-p)$ preferably ranges from 5 to 200, more preferably from 6 to 150, more preferably from 8 to 100, more preferably from 12 to 70, more preferably from 20 to 50, more preferably from 25 to 40, more preferably from 28 to 35, and even more preferably from 29 to 33.

3. The process of embodiment 1 or 2, wherein the $YO_2:X_2O_3$ molar ratio of the mixture provided in step (1) ranges from 1 to 200, preferably from 2 to 150, more preferably from 5 to 100, more preferably from 10 to 70, more preferably from 15 to 50, more preferably from 20 to 45, and even more preferably from 25 to 42.

4. The process of any of embodiment 1 to 3, wherein the mixture provided in step (1) comprises one or more alkali metals M, wherein the one or more alkali metals M are preferably selected from the group consisting of Li, Na, K, Rb, and Cs, more preferably from the group consisting of Li, Na, Rb, and Cs, wherein even more preferably the one or more alkali metals are Li and/or Na, and preferably Na.

5. The process of embodiment 4, wherein the $M_2O:YO_2$ molar ratio in the mixture according to step (1) ranges from 0.01 to 5, preferably from 0.05 to 2, more preferably from 0.1 to 1.5, more preferably from 0.15 to 1, more preferably from 0.2 to 0.5, and even more preferably from 0.25 to 0.35.

6. The process of embodiment 4 or 5, wherein the $YO_2:X_2O_3:M_2O$ molar ratios in the mixture according to step (1) range from (5-100):1:(0.5-50), preferably from (10-70):1:(1-30), more preferably from (15-50):1:(2-20), more preferably from (20-45):1:(4-15), and even more preferably from (25-42):1:(5-14).

7. The process of any of embodiments 1 to 6, wherein the mixture provided in step (1) contains no K and/or no Sr, preferably no K.

8. The process of any of embodiments 1 to 7, wherein the seed crystals having a CHA framework structure display an X-ray diffraction pattern wherein the most intense reflection having an intensity of 100% has a diffraction angle 2θ in the range of from 5 to 15, preferably of from 8 to 12, more preferably of from 9 to 10.5, more preferably of from 9.2 to 10, more preferably of from 9.5 to 9.7, more preferably of from 9.55 to 9.65, and even more preferably of from 9.58 to 9.62, wherein the diffraction angle 2θ is obtained using Cu K(alpha 1) radiation.

9. The process of any of embodiments 1 to 8, wherein Y comprised in the seed crystals and/or, preferably and, wherein Y preferably provided in step (1) in the one or more sources for $YO_2$ are, independently from one another, selected from the group consisting of Si, Sn, Ti, Zr, Ge, and mixtures of two or more thereof, Y preferably being Si.

10. The process of any of embodiments 1 to 9, wherein the one or more sources for $YO_2$ comprises one or more silicates, preferably one or more alkali metal silicates, wherein the alkali metal is preferably selected from the group consisting of Li, Na, K, Rb, and Cs, wherein more preferably the alkali metal is Na and/or K, and wherein even more preferably the alkali metal is Na.

11. The process of embodiment 10, wherein the mixture provided in step (1) preferably further comprises one or more silicas in addition to the one or more silicates, preferably one or more silica hydrosols and/or one or more colloidal silicas, and even more preferably one or more colloidal silicas in addition to the one or more silicates.

12. The process of embodiment 10 or 11, wherein the mixture provided in step (1) comprises water glass, preferably sodium and/or potassium silicate, more preferably sodium silicate.

13. The process of any of embodiments 1 to 12, wherein X comprised in the seed crystals and/or, preferably and, wherein X provided in step (1) in the one or more sources for $X_2O_3$ are, independently from one another, selected from the group consisting of Al, B, In, Ga, and mixtures of two or more thereof, X preferably being Al and/or B, and more preferably being Al.

14. The process of any of embodiments 1 to 13, wherein the one or more sources for $X_2O_3$ comprises one or more aluminate salts, preferably on or more alkali metal aluminates, wherein the alkali metal is preferably selected from the group consisting of Li, Na, K, Rb, and Cs, wherein more preferably the alkali metal is Na and/or K, and wherein even more preferably the alkali metal is Na.

15. The process of any of embodiments 1 to 14, wherein Z optionally comprised in the seed crystals and/or, preferably and, wherein Z in the one or more sources for $Z_2O_5$ optionally further provided in step (1) are, independently from one another, selected from the group consisting of P, As, Sb, Bi, V, Nb, Ta, and combinations of two or more thereof, preferably from the group consisting of P, As, V, and combinations of two or more thereof, wherein more preferably Z comprises P or As, preferably P, and wherein even more preferably Z is P.

16. The process of any of embodiments 1 to 15, wherein the one or more sources for $Z_2O_5$ comprises one or more phosphates and/or one or more oxides and/or one or more acids of phosphorous, preferably one or more acids of phosphorous, more preferably phosphoric acid, and wherein even more preferably the source for $Z_2O_5$ is phosphoric acid.

17. The process of any of embodiments 1 to 16, wherein the seed crystals having a CHA framework structure comprise one or more zeolites selected from the group consisting of $(Ni(deta)_2)$-UT-6, Chabazite, |Li—Na| [Al—Si—O]-CHA, DAF-5, Na-Chabazite, K-Chabazite, LZ-218, Linde D, Linde R, MeAPSO-47, Phi, SAPO-34, SAPO- 47, SSZ-13, SSZ-62, UiO-21, Willhendersonite, ZK-14, ZYT-6, and combinations of two or more thereof,
preferably from the group consisting of Chabazite, |Li—Na| [Al—Si—O]-CHA, Na-Chabazite, K-Chabazite, SAPO-34, SAPO-47, SSZ-13, SSZ-62, and combinations of two or more thereof,
more preferably from the group consisting of Chabazite, |Li—Na| [Al—Si—O]-CHA, Na-Chabazite, SAPO-34, SSZ-13, and combinations of two or more thereof,
more preferably from the group consisting of Na-Chabazite, SAPO-34, SSZ-13, and combinations of two or more thereof,
wherein even more preferably the seed crystals having a CHA framework structure comprise Na-Chabazite and/or SAPO-34, and preferably Na-Chabazite.

18. The process of any of embodiments 1 to 17, wherein the amount of seed crystals in the mixture according to step (1) ranges from 0.05 to 50 wt.-% based on 100 wt.-% of $YO_2$ in the one or more sources for $YO_2$, preferably from 0.1 to 30 wt.-%, more preferably from 0.5 to 20 wt.-%, more preferably from 1 to 15 wt.-%, more preferably from 5 to 12 wt.-%, and even more preferably from 9 to 11 wt.-%.

19. The process of any of embodiments 1 to 18, wherein the mixture according to step (1) further comprises one or more solvents, wherein said one or more solvents preferably comprises water, more preferably distilled water.

20. The process of any of embodiments 1 to 19, wherein the $H_2O$:$YO_2$ molar ratio of the mixture according to step (1) ranges from 1 to 150, preferably from 3 to 100, more preferably from 5 to 50, more preferably from 10 to 30, more preferably from 15 to 25, and even more preferably from 16 to 19.

21. The process of any of embodiments 1 to 20, wherein the mixture according to step (1) further comprises one or more sources of one or more elements suitable for isomorphous substitution of at least a portion of the Y atoms and/or of the X atoms in the CHA-type framework structure, wherein the one or more elements are preferably selected from the group consisting of B, Fe, Ti, Sn, Ga, Ge, Zr, V, Nb, Cu, Zn, Li, Be, and mixtures of two or more thereof, more preferably wherein the one or more elements are selected from the group consisting of B, Fe, Ti, Sn, Zr, Cu, and mixtures of two or more thereof, wherein even more preferably the one or more element is Fe and/or Cu, preferably Cu.

22. The process of embodiment 21, wherein the molar ratio of $YO_2$ to the one or more elements suitable for isomorphous substitution ranges from 5 to 200, preferably from 10 to 100, more preferably from 20 to 70, and even more preferably from 25 to 50.

23. The process of any of embodiments 1 to 22, wherein the crystallization in step (2) involves heating of the mixture, preferably at a temperature ranging from 80 to 200° C., more preferably from 90 to 180° C., more preferably from 100 to 160° C., more preferably from 110 to 140° C., and even more preferably from 115 to 130° C.

24. The process of any of embodiments 1 to 23, wherein the crystallization in step (2) is conducted under solvothermal conditions, preferably under hydrothermal conditions.

25. The process of any of embodiments 1 to 24, wherein the crystallization in step (2) involves heating of the mixture for a period ranging from 5 to 200 h, more preferably from 20 to 160 h, more preferably from 60 to 140 h, and even more preferably from 100 to 130 h.

26. The process of any of embodiments 1 to 25 further comprising one or more of the following steps of (3) isolating the zeolitic material having a CHA-type framework structure, preferably by filtration,
and/or
(4) washing the zeolitic material having a CHA-type framework structure,
and/or
(5) drying the zeolitic material having a CHA-type framework structure,
and/or
(6) subjecting the zeolitic material having a CHA-type framework structure to an ion-exchange procedure,
wherein the steps (3) and/or (4) and/or (5) and/or (6) can be conducted in any order, and
wherein one or more of said steps is preferably repeated one or more times.

27. The process of any of embodiments 1 to 26, wherein in the at least one step (6) at least one ionic non-framework element contained in the zeolitic material having a CHA-type framework is ion-exchanged, preferably against at least one cation and/or cationic element, wherein at least one cation and/or cationic element is preferably selected from the group consisting of $H^+$, $NH_4^+$, Sr, Zr, Cr, Fe, Co, Ni, Cu, Zn, Ru, Rh, Pd, Ag, Os, Ir, Pt, Au, and mixtures of two or more thereof, more preferably from the group consisting of $H^+$, $NH_4^+$, Sr, Cr, Fe, Co, Ni, Cu, and mixtures of two or more thereof, more preferably from the group consisting of $H^+$, $NH_4^+$, Fe, Cu, and mixtures of two or more thereof, wherein even more preferably the at least one cation and/or cationic element is Cu and/or Fe, and preferably Cu,
wherein said at least one ionic non-framework element is preferably one or more alkali metals, more preferably Na and/or K, and even more preferably Na.

28. The process of any of embodiments 1 to 27, wherein the organotemplate-free synthesis does not comprise a calcination step.

29. The process of any of embodiments 1 to 28, wherein the seed crystals comprise a zeolitic material having a CHA-type framework structure as synthesized according to the process of any one of embodiments 1 to 28.

30. A synthetic organotemplate-free zeolitic material having a CHA-type framework structure obtainable and/or obtained according to any one of embodiments 1 to 29, wherein said zeolitic material is preferably non-calcined.

31. A synthetic organotemplate-free zeolitic material having a CHA-type framework structure, optionally obtainable and/or obtained according to any of embodiments 1 to 29, wherein the CHA framework structure comprises $YO_2$, $X_2O_3$, and optionally comprises $Z_2O_5$, wherein Y is a tetravalent element, X is a trivalent element, and Z is a pentavalent element,
wherein said zeolitic material is non-calcined, and
wherein if the CHA framework structure does not contain $Z_2O_5$, the CHA framework structure then has a $YO_2$:$X_2O_3$ molar ratio of 7 of greater than 7, wherein the $YO_2$:$X_2O_3$ molar ratio preferably ranges from 7 to 200, more preferably from 7.5 to 100, more preferably from 8 to 50, more preferably from 8.5 to 30, more preferably from 9 to 20, more preferably from 9.3 to 17, and even more preferably from 9.5 to 15.

32. The zeolitic material of embodiment 30 or 31, wherein Y is selected from the group consisting of Si, Sn, Ti, Zr, Ge, and mixtures of two or more thereof, Y preferably being Si.

33. The zeolitic material of any of embodiments 30 to 32, wherein X is selected from the group consisting of Al, B, In, Ga, and mixtures of two or more thereof, X preferably being Al and/or B, and more preferably being Al.

34. The zeolitic material of any of embodiments 30 to 33, wherein if the CHA framework structure further comprises $Z_2O_5$ in addition to $YO_2$ and $X_2O_3$, the CHA framework structure then has a $YO_2$:n$X_2O_3$:p$Z_2O_5$ molar ratio, wherein the value for the ratio (1+2p):(n−p) is 7 or greater than 7, wherein the value for the ratio (1+2p):(n−p) preferably ranges from 7 to 200, more preferably from 7.5 to 100, more preferably from 8 to 50, more preferably from 8.5 to 30, more preferably from 9 to 20, more preferably from 9.3 to 17, and even more preferably from 9.5 to 15.

35. The zeolitic material of any of embodiments 30 to 34, wherein Z is selected from the group consisting of P, As, Sb, Bi, V, Nb, Ta, and combinations of two or more thereof, preferably from the group consisting of P, As, V, and combinations of two or more thereof, wherein more preferably Z comprises P or As, preferably P, and wherein even more preferably Z is P.

36. The zeolitic material of any of embodiments 30 to 35, wherein the CHA framework structure displays an X-ray diffraction pattern wherein the most intense reflection having an intensity of 100% has a diffraction angle 2θ in the range of from 5 to 15, preferably of from 8 to 12, more preferably of from 9 to 10.5, more preferably of from 9.2 to 10, more preferably of from 9.5 to 9.7, more preferably of from 9.55 to 9.65, and even more preferably of from 9.58 to 9.62,
wherein the diffraction angle 2θ is obtained using Cu K(alpha 1) radiation.

37. The zeolitic material of any of embodiments 30 to 36, wherein Y comprises Si, and wherein the $^{29}$Si MAS NMR of the zeolitic material comprises:
a first peak (P1) in the range of from −96 to −98.8 ppm, preferably of from −96.5 to −98.5 ppm, more preferably of from −96.8 to −98.2 ppm, more preferably of from −97 to −98 ppm, more preferably of from −97.2 to −97.8 ppm, and even more preferably of from −97.4 to −97.6 ppm;
a second peak (P2) in the range of from −102 to −104.5 ppm, preferably of from −102.5 to −104 ppm, more preferably of from −102.8 to −103.7 ppm, more preferably of from −103 to −103.5 ppm, and even more preferably of from −103.2 to −103.4 ppm; and
a third peak (P3) in the range of from −109 to −111 ppm, preferably of from −108.5 to −110.5 ppm, more preferably of from −109 to −110 ppm, more preferably of from −109.1 to −109.7 ppm, more preferably of from −109.2 to −109.6 ppm, and even more preferably of from −109.3 to −109.5 ppm;
wherein the integration of the first, second, and third peaks in the $^{29}$Si MAS NMR of the zeolitic material offers a ratio of the integration values P1:P2:P3 ranging from (0.35-0.55):1:(0.1-1.8), preferably from (0.4-0.5):1:(0.25-1.5), more preferably from (0.42-0.49):1:(0.4-1.2), more preferably from (0.43-0.48):1:(0.5-0.9), more preferably from (0.435-0.475):1:(0.55-0.7), more preferably from (0.45-0.47):1:(0.6-0.65), and even more preferably from (0.455-0.465):1:(0.62-0.64).

38. The zeolitic material of any of embodiments 30 to 37, wherein X comprises Al, and wherein the $^{27}$Al MAS NMR of the zeolitic material comprises a peak (P'1) in the range of from −54.5 to −57.5 ppm, preferably of from −55 to −57 ppm, more preferably of from −55.5 to −56.8 ppm, more preferably of from −55.7 to −56.5 ppm, more preferably of from −55.9 to −56.3 ppm, more preferably of from −56 to −56.2 ppm.

39. The zeolitic material of any of embodiments 30 to 38, wherein the CHA framework comprises one or more alkali metals M as extra-framework ions, wherein the one or more alkali metals M are preferably selected from the group consisting of Li, Na, K, Rb, and Cs, wherein more preferably M is Na and/or K, and wherein even more preferably M is Na.

40. The zeolitic material of embodiment 39, wherein the molar ratio of alkali metal M:$X_2O_3$ ranges from 0.05 to 10, preferably from 0.1 to 7, more preferably from 0.5 to 5, more preferably from 1 to 3.5, more preferably from 1.5 to 3, and even more preferably from 1.8 to 2.8.

41. The zeolitic material of embodiment 39 or 40, wherein at least a portion of the alkali metal atoms M is substituted by one or more cation and/or cationic element, wherein the one or more cation and/or cationic element is preferably selected from the group consisting of $H^+$, $NH_4^+$, Sr, Zr, Cr, Fe, Co, Ni, Cu, Zn, Ru, Rh, Pd, Ag, Os, Ir, Pt, Au, and mixtures of two or more thereof, more preferably from the group consisting of $H^+$, $NH_4^+$, Sr, Cr, Fe, Co, Ni, Cu, and mixtures of two or more thereof, more preferably from the group consisting of $H^+$, $NH_4^+$, Fe, Cu, and mixtures of two or more thereof, and even more preferably wherein at least a portion of the alkali metal atoms M is substituted by Fe and/or Cu, preferably by Cu.

42. The zeolitic material of any of embodiments 30 to 41, wherein at least a portion of the Y atoms and/or of the X atoms in the CHA-type framework structure is isomorphously substituted by one or more elements, wherein the one or more elements are preferably selected from the group consisting of B, Fe, Ti, Sn, Ga, Ge, Zr, V, Nb, Cu, Zn, Li, Be, and mixtures of two or more thereof, more preferably wherein the one or more elements are selected from the group consisting of B, Fe, Ti, Sn, Zr, Cu, and mixtures of two or more thereof, wherein even more preferably the one or more element is Fe and/or Cu, preferably Cu.

43. The zeolitic material of any of embodiments 30 to 42, wherein the zeolitic material comprises one or more zeolites selected from the group consisting of (Ni(deta)$_2$)-UT-6, Chabazite, |Li—Na| [Al—Si—O]-CHA, DAF-5, Na-Chabazite, K-Chabazite, LZ-218, Linde D, Linde R, MeAPSO-47, Phi, SAPO-34, SAPO-47, SSZ-13, SSZ-62, UiO-21, Willhendersonite, ZK-14, ZYT-6, and combinations of two or more thereof,
preferably from the group consisting of Chabazite, |Li—Na| [Al—Si—O]-CHA, Na-Chabazite, K-Chabazite, SAPO-34, SAPO-47, SSZ-13, SSZ-62, and combinations of two or more thereof,
more preferably from the group consisting of Chabazite, |Li—Na| [Al—Si—O]-CHA, Na-Chabazite, SAPO-34, SSZ-13, and combinations of two or more thereof,
more preferably from the group consisting of Na-Chabazite, SAPO-34, SSZ-13, and combinations of two or more thereof,
wherein even more preferably the seed crystals having a CHA framework structure comprise Na-Chabazite and/or SAPO-34, and preferably Na-Chabazite.

44. Use of a synthetic organotemplate-free zeolitic material having a CHA framework structure according to any of embodiments 30 to 43 as a molecular sieve, as an adsorbent, for ion-exchange, as a catalyst and/or as a catalyst support, preferably as a catalyst for the selective catalytic reduction (SCR) of nitrogen oxides $NO_x$; for the oxidation of $NH_3$, in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins, and more preferably in methanol to olefin (MTO) catalysis.

DESCRIPTION OF THE FIGURES

In the respective $^{29}Si$ and $^{27}Al$ NMR spectra displayed in the Figures, the values in ppm are plotted along the abscissa, wherein the exact ppm values are indicated above the respective peaks. Furthermore, the integrals for the relative peak intensity are indicated below the respective peaks.

The X-ray diffraction (XRD) patterns shown in the Figures were respectively measured using Cu K alpha-1 radiation. In the respective diffractograms, the diffraction angle 2 theta in ° is shown along the abscissa and the intensities are plotted along the ordinate.

FIG. 1A shows the X-ray diffraction pattern of the sodium Chabazite seed crystals obtained from hydrothermal synthesis in Example 1. As a reference, the diffractogram further includes a line pattern which is typical for the CHA-type framework structure.

Figure 1B:
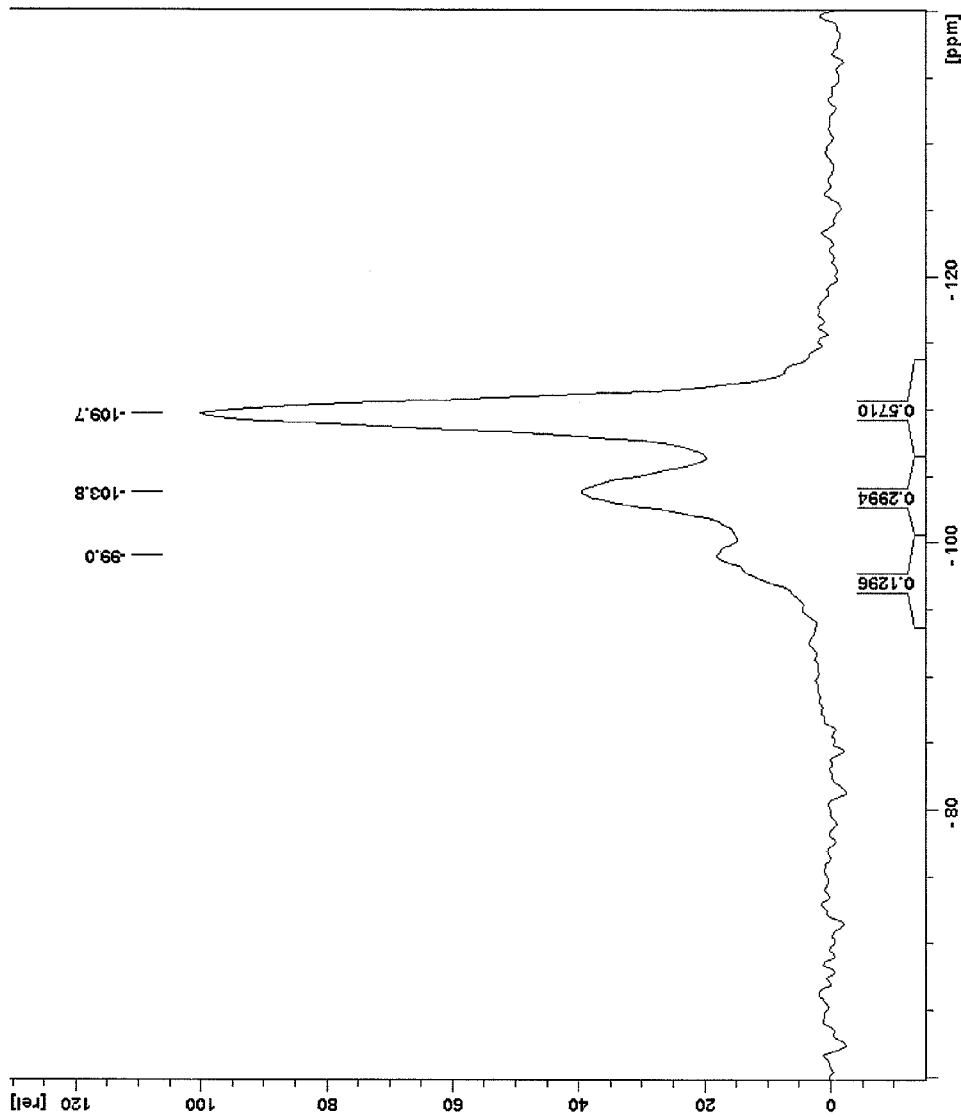
FIG. 1B shows the $^{29}Si$ MAS NMR of sodium Chabazite obtained from a templated synthesis procedure according to one or more embodiments of the invention.

FIG. 1B shows the $^{29}Si$ MAS NMR spectrum obtained for the sodium Chabazite seed crystals obtained from hydrothermal synthesis in Example 1.

Figure 1C:
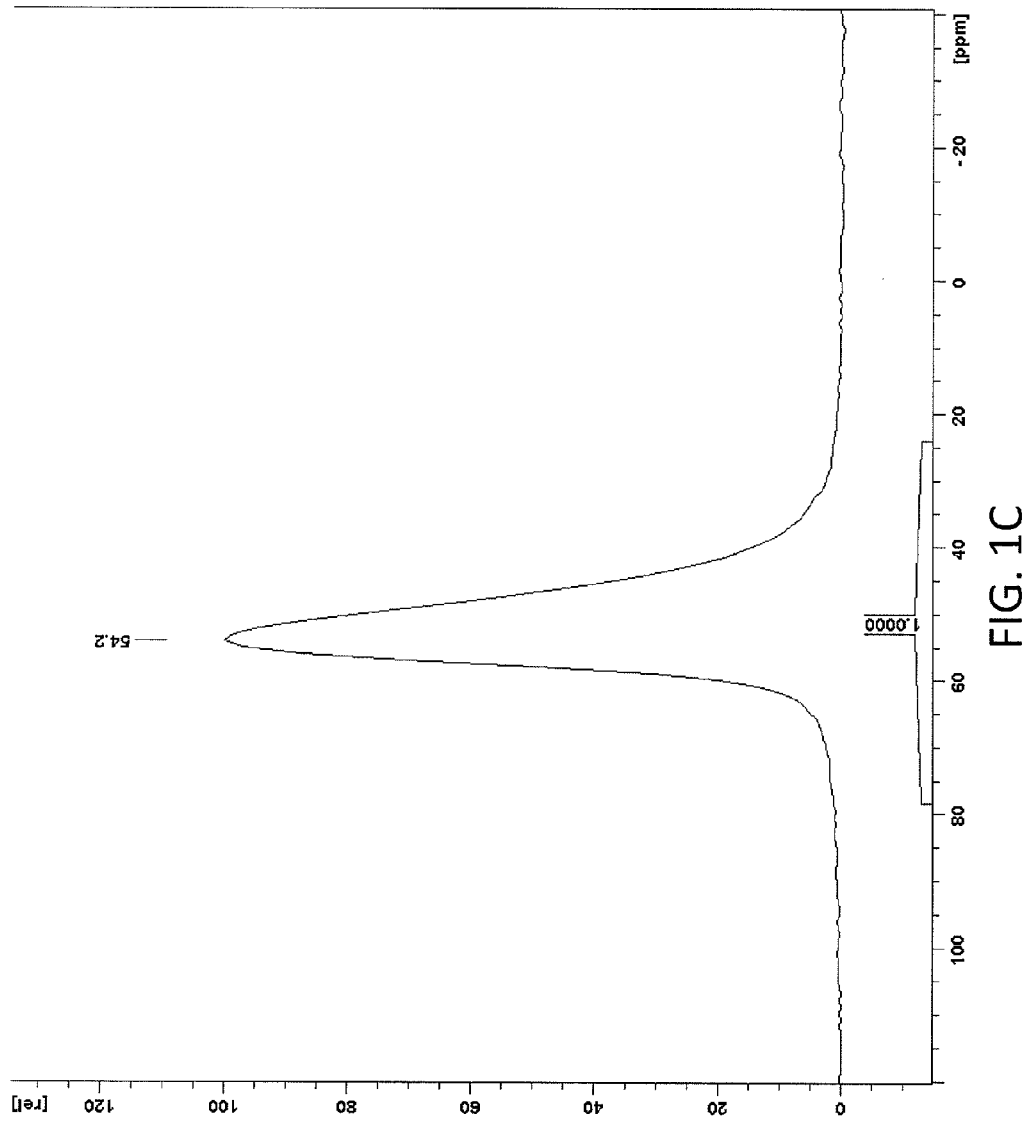
FIG. 1C shows the $^{27}Al$ MAS NMR spectrum of a sodium Chabazite product according to one or more embodiments of the invention.

FIG. 1C shows the $^{27}Si$ MAS NMR spectrum obtained for the sodium Chabazite seed crystals obtained from hydrothermal synthesis in Example 1.

Figure 1D:
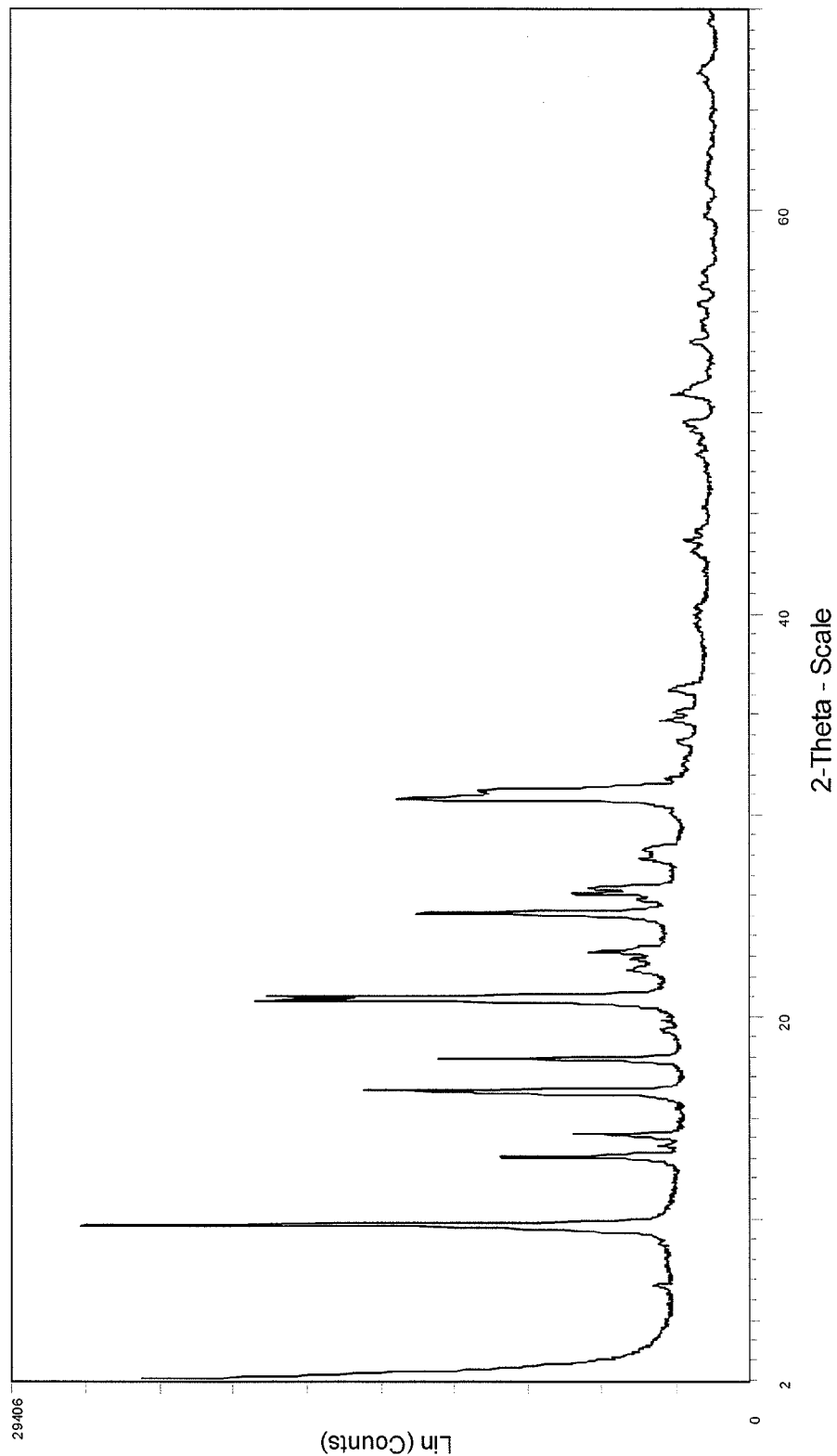
FIG. 1D shows the XRD of the crystalline product obtained according to a organotemplate-free synthesis according to one or more embodiments of the invention.

FIG. 1D shows the X-ray diffraction pattern of the zeolitic material having a CHA-type framework structure obtained from seed-directed synthesis in Example 1.

Figure 1E:
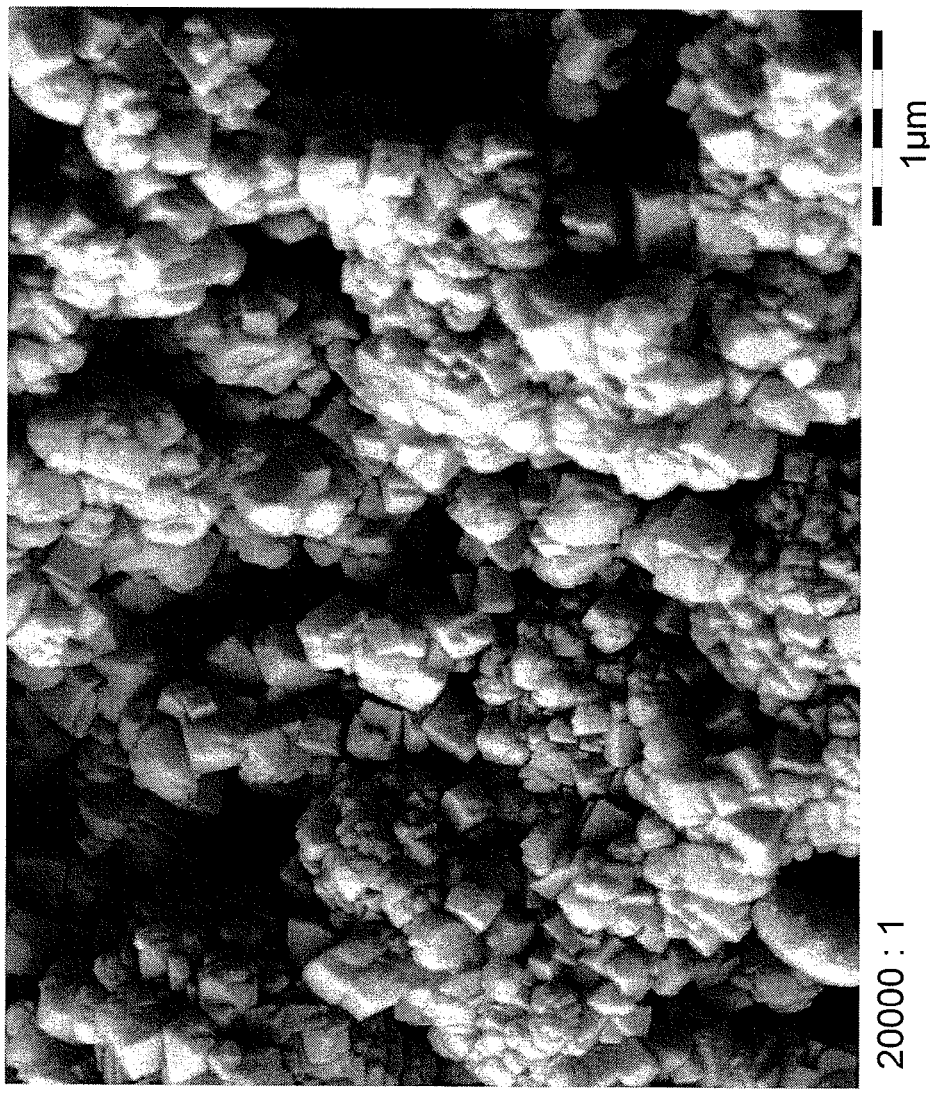
FIG. 1E shows an SEM-image of a crystalline product according to one or more embodiments of the invention.

FIG. 1E displays the zeolitic material obtained from seed-directed synthesis in Example 1 as obtained using scanning electron microscopy.

Figure 1F:
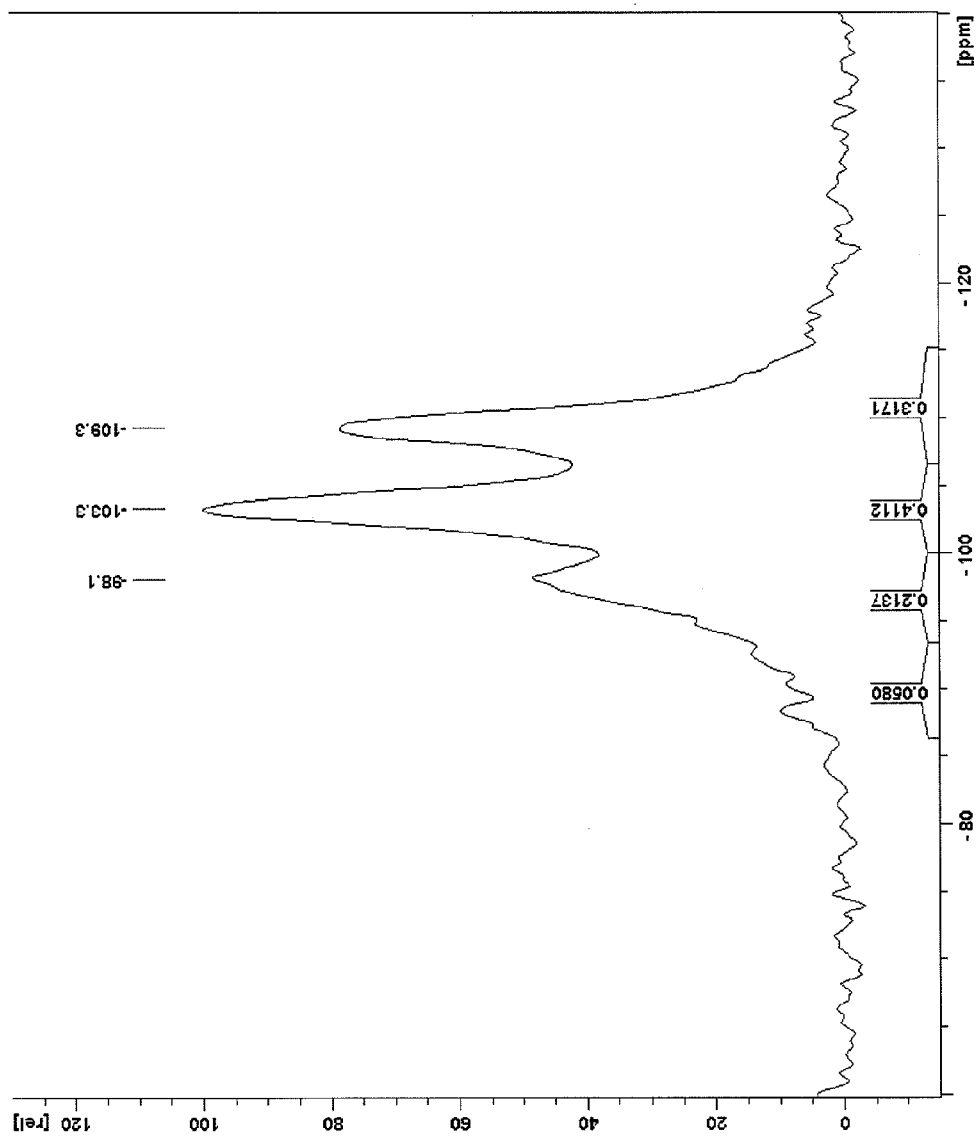
FIG. 1F shows the $^{29}Si$ MAS NMR of the crystalline product obtained from a synthetic procedure according to one or more embodiments of the invention.

FIG. 1F shows the $^{29}Si$ MAS NMR spectrum obtained for the zeolitic material having a CHA-type framework structure obtained from seed-directed synthesis in Example 1.

FIG. 1C shows the $^{27}Si$ MAS NMR spectrum obtained for the zeolitic material having a CHA-type framework structure obtained from seed-directed synthesis in Example 1.

Figure 2A:
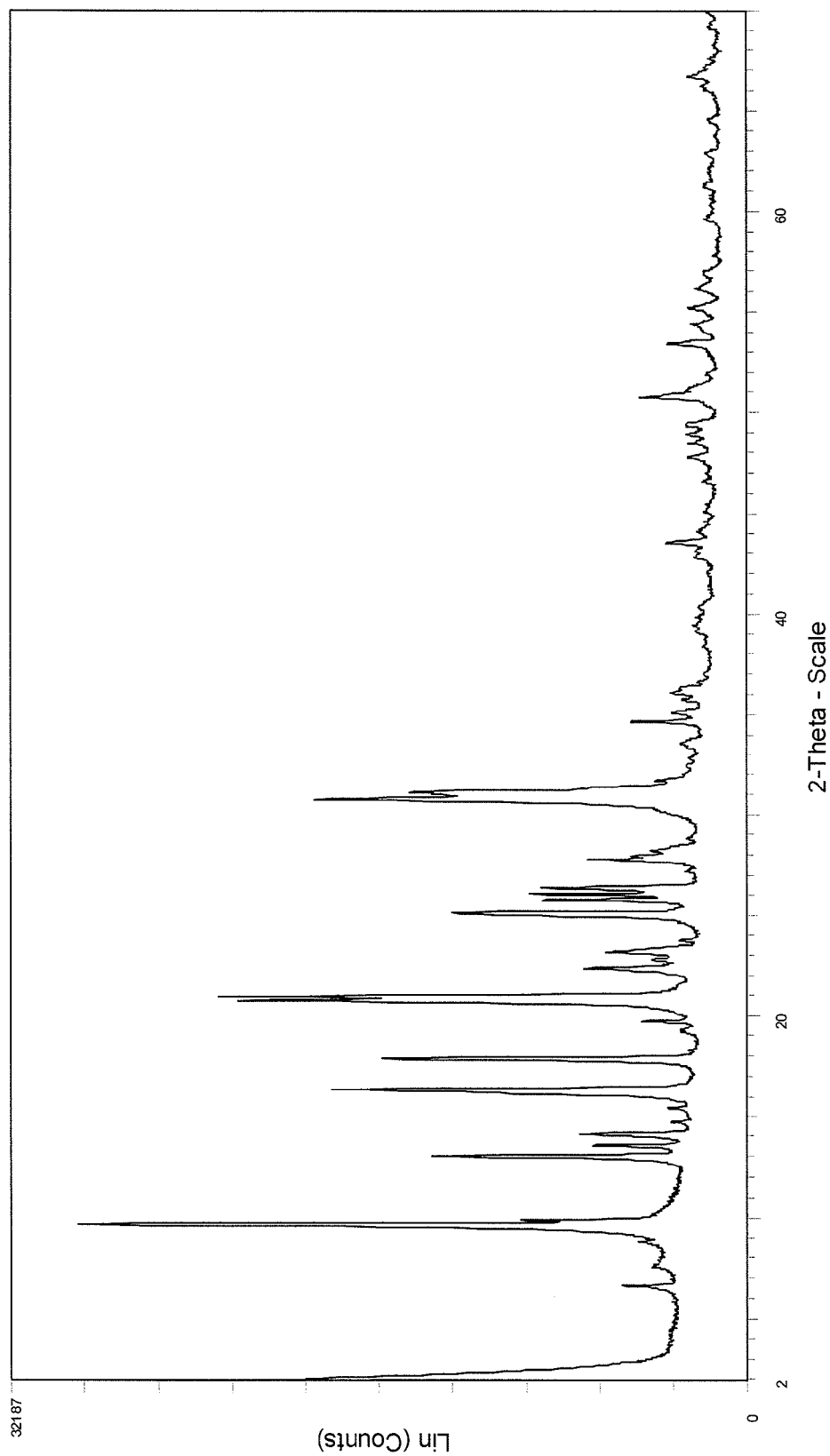
FIG. 2A shows the XRD of a crystalline product obtained from the organotemplate-free synthesis according to one or more embodiments of the invention.

FIG. 2A shows the X-ray diffraction pattern of the zeolitic material having a CHA-type framework structure obtained from seed-directed synthesis in Example 2.

FIG. 2B shows the $^{29}Si$ MAS NMR spectrum obtained for the zeolitic material having a CHA-type framework structure obtained from seed-directed synthesis in Example 2.

Figure 2C:
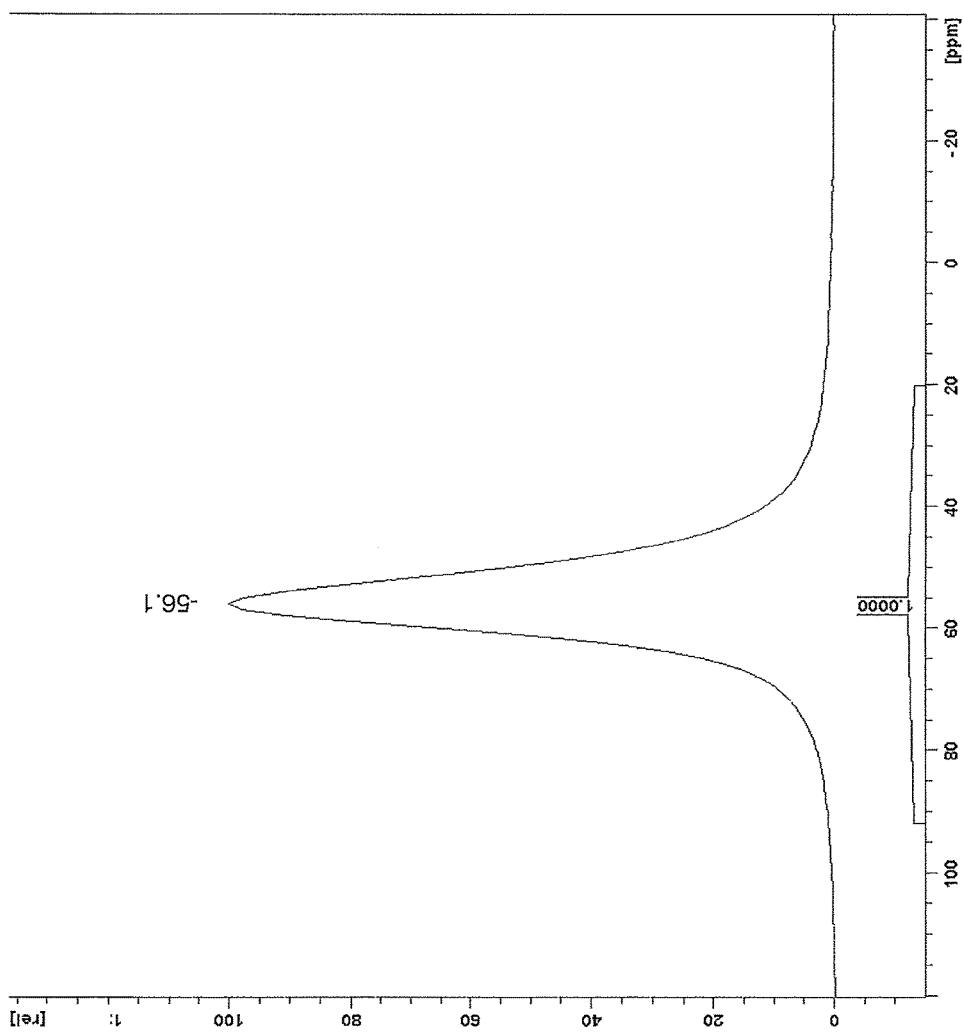
FIG. 2C shows the $^{27}Al$ MAS NMR spectrum of a crystalline product according to one or more embodiments of the invention.

FIG. 2C shows the $^{27}Si$ MAS NMR spectrum obtained for the zeolitic material having a CHA-type framework structure obtained from seed-directed synthesis in Example 2.

Figure 3:
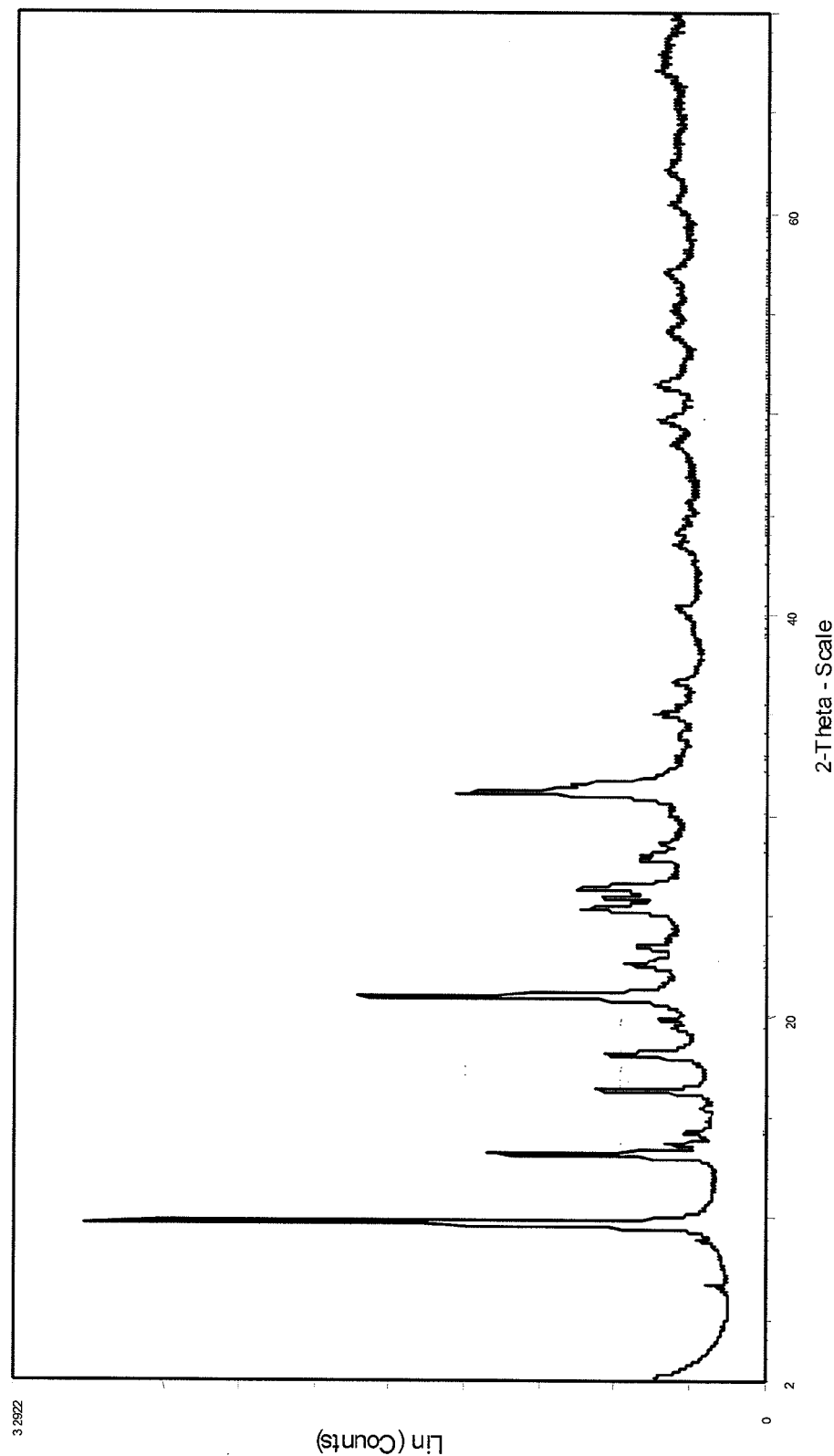
FIG. 3 shows the XRD of the H-form of the crystalline product obtained from an ion exchange according to one or more embodiments of the invention.

FIG. 3 shows the X-ray diffraction pattern of the H-form of the zeolitic material having a CHA-type framework structure obtained from seed-directed synthesis after ion-exchange in Example 3.

FIGS. 4-7 show the X-ray diffraction patterns of the zeolitic materials having a CHA-type framework structure obtained from seed-directed synthesis in Examples 4-7, respectively.

EXAMPLES

In the following examples, $^{29}Si$ and $^{27}Al$ solid-state NMR experiments were conducted on a Avance 300 spectrometer equipped with a wide-bore magnet (Bruker Biospin, Germany).

For $^{29}Si$ solid-state NMR, samples were packed in 7 mm rotors and measured under 5 kHz Magic Angle Spinning at room temperature. $^{29}Si$ spectra were recorded using direct polarization with a 90° pulse, 25 ms signal acquisition under high-power proton heteronuclear decoupling, and a recycle delay of 120 s. Spectra were referenced with the polymer Q8M8 as an external secondary standard, setting the resonance of the trimethylsilyl M group to 12.5 ppm. The spectra were processed with Bruker Topspin (Bruker Biospin, Germany).

For $^{27}Al$ solid-state NMR, samples were packed in 4 mm rotors and measured under 10 kHz Magic Angle Spinning at room temperature. $^{27}Al$ spectra were recorded using direct polarization with a 15° pulse, 20 ms signal acquisition, and a recycle 0.25 s. Spectra were referenced with 1 mol/L $AlCl_3·6H_2O$ solution as zero reference. The spectra were processed with Bruker Topspin (Bruker Biospin, Germany).

Example 1

Preparation of the Chabazite Seed Crystals 16.5 kg of an aqueous solution of 1-adamantyltrimethyl ammonium hydroxide (13.4 wt.-%) and 570 g of sodium hydroxide were placed into a 60 l autoclave while stirring. After 30 min, 1.786 kg of aluminum tri-isopropanolate were added thereto and the resulting mixture stirred for 1 h, after which 21.4 kg of LUDOX® AS40 (Aldrich) were added to the mixture which was then stirred an additional 30 minutes, thus affording a synthesis gel displaying a $SiO_2:Al_2O_3:Na_2O:H_2O$:1-adamantyltrimethyl ammonium molar ratio of 33:1:1.63:341:2.35. The autoclave was then sealed shut and the synthesis mixture heated to 160° C. using a heat ramp of 70° C./h after which the temperature was held for 30 h. After cooling to room temperature, the resulting suspension was neutralized to pH=7 using nitric acid (10%), after which the resulting precipitate was filtered and washed with distilled water to electroneutrality of the wash water having a conductivity of less than 10 mS. The resulting filter cake was then slurried with distilled water to afford a solution with 10 wt.-% solids. The slurry was then spray-dried at a temperature of 290° C., after which the resulting solid was heated to 600° C. using a ramp of 2° C./min and held at that temperature for 5 h, thus affording 3.85 kg of crystalline sodium Chabazite as a white microcrystalline powder.

Elemental Analysis:
Si: 37 g/100 g
Al: 2.2 g/100 g
Na: 1.1 g/100 g

Therefore, according to the elemental analysis, the $SiO_2:Al_2O_3$ ratio of the product is approximately 32.4:1.

In FIG. 1A, the XRD of the sodium Chabazite seed material is displayed, showing the characteristic diffraction pattern of the CHA-type zeolite framework structure.

In FIG. 1B, the $^{29}Si$ MAS NMR of sodium Chabazite obtained from the templated synthesis procedure is shown. As may be taken from the NMR spectrum displayed in FIG. 1B, three major peaks P are observed at −99.0 ppm (P1), −103.8 ppm (P2), and −109.7 ppm (P3), respectively, wherein the relative instensity of the peaks afford a P1:P2:P3 ratio of 0.1296:0.2994:0.5710. In particular, the signal at −109 ppm of the $^{29}Si$ MAS NMR corresponds to Q4 structures, wherein the respective signals at −103 and −98 ppm are attributed to the Q3 or to Q4 structures.

In FIG. 1C, the $^{27}Al$ MAS NMR spectrum of the sodium Chabazite product is displayed, revealing a peak at −54.2 ppm corresponding to tetrahedrally coordinated Al sites of the chabazite material obtained from templated synthesis.

Seed-Directed Synthesis of a CHA-Type Zeolite 85.83 g of distilled water were placed in a 250 ml autoclave to which 2.38 g of NaAlO$_2$ and 3.04 g of sodium Chabazite seed crystals were added under stirring. 97.34 g of an aqueous sodium waterglass solution (34%; Woellner) were then slowly added. Finally, 11.51 g of LUDOX® AS40 (40 wt.-% SiO$_2$) were added and the resulting suspension stirred a further 2 min, thus affording a synthesis gel displaying a SiO$_2$:Al$_2$O$_3$:Na$_2$O:H$_2$O molar ratio of 40:1:11.5:705. The resulting synthesis gel was then crystallized in the autoclave at 120° C. at which it was held for 120 h. After letting cool to room temperature, the suspension was filtered off and the filter cake washed three times with distilled water. The washed filter cake was then dried at 120° C. for 25 h to afford 12.5 g of a zeolitic material having the CHA framework structure as a white microcrystalline powder.

Elemental Analysis
Si: 35 g/100 g
Al: 4.6 g/100 g
Na: 5.3 g/100 g

Therefore, according to the elemental analysis, the SiO$_2$:Al$_2$O$_3$:Na$_2$O ratio of the product is approximately 14.6:1:1.35.

In FIG. 1D, the XRD of the crystalline product obtained according to the organotemplate-free synthesis is shown, revealing a diffraction pattern characteristic of a CHA-type framework structure. FIG. 1E displays an SEM-image of the crystalline product.

Thus, a zeolitic material having the CHA-type framework structure may effectively be obtained using sodium Chabazite seed crystals obtained from synthesis using an organotemplate as structure directing agent. In particular, a Chabazite-type zeolitic material may be obtained displaying an intermediate SiO$_2$:Al$_2$O$_3$ molar ratio of about 15. Furthermore, said material may be obtained in relatively high purity, the remaining solid isolated from the reaction product largely attributed to amorphous silica and/or silicalite.

In FIG. 1F, the $^{29}$Si MAS NMR of the crystalline product obtained from the synthetic procedure is shown. As may be taken from the NMR spectrum displayed in FIG. 1F, three major peaks P are observed at −98.1 ppm (P1), −103.3 ppm (P2), and −109.3 ppm (P3), respectively, wherein the relative instensity of the peaks afford a P1:P2:P3 ratio of 0.2137:0.4112:0.3171. In particular, the signal at −109 ppm of the $^{29}$Si MAS NMR corresponds to Q4 structures, wherein the respective signals at −103 and −98 ppm are attributed to the Q3 or to Q4 structures.

In FIG. 1G, the $^{27}$Al MAS NMR spectrum of the crystalline product is displayed, revealing a peak at −55.9 ppm corresponding to tetrahedrally coordinated Al sites of the chabazite material obtained from organotemplate free synthesis. The minor peak at −10.5 ppm is attributed to octahedrally coordinated aluminum from side products and impurities contained in the sample.

Thus, upon comparing the $^{29}$Si and $^{27}$Al MAS NMR spectra in FIGS. 1B and 1C for sodium Chabazite obtained from templated synthesis with the corresponding spectra in FIGS. 1F and 1G obtained for the present zeolitic material having a CHA type framework structure as obtained from organotemplate-free synthesis, it is clearly apparent that there are differences with respect to the ppm values at which corresponding peaks are observed. Even surprisingly, considerable differences are observed with respect to the relative intensities of the peaks in the $^{29}$Si MAS NMR spectra. Taken together, this reflects a clearly different distribution of the Al- and Si-sites in the CHA framework structure obtained from organotemplate-free synthesis, such that the products may also be clearly distinguished from materials obtained from templated synthesis. In particular, this applies for the calcined products as well, such that the inventive products may be clearly distinguished from zeolitic materials having the CHA-type framework structure obtained from templated synthesis not only be the fact that the inventive products as directly obtained from synthesis do not contain an organotemplate. Far more the inventive materials may quite unexpectedly be distinguished from the former by a unique CHA type framework architecture, in particular with respect to the distribution of the Si and Al-sites, thus affording new materials with unprecedented chemical and physical properties.

Example 2

81.28 g of distilled water were placed in a 250 ml autoclave after which 2.38 g of NaAlO$_2$ and 3.04 g of sodium Chabazite seed crystals obtained from Example 1 were added under stiffing. Subsequently, 115.4 g of an aqueous sodium waterglass solution (34%; Woellner) were slowly added, after which the suspension was stirred an additional 2 min, thus affording a synthesis gel displaying a SiO$_2$:Al$_2$O$_3$:Na$_2$O:H$_2$O molar ratio of 40:1:13.4:705. The autoclave was then sealed shut and the synthesis mixture crystallized at 120° C. for 120 h. After letting cool to room temperature, the resulting suspension was filtered off and the filtered cake washed three times with distilled water. The filter cake was then dried at 120° C. for 24 h to afford 10.4 g of Chabazite as a white microcrystalline powder.

Elemental Analysis:
Si: 28.7 g/100 g
Al: 5.6 g/100 g
Na: 4.4 g/100 g

Therefore, according to elemental analysis, the SiO$_2$:Al$_2$O$_3$:Na$_2$O molar ratio of the product is approximately 9.8:1:0.92.

FIG. 2A shows the XRD of the crystalline product obtained from the organotemplate-free synthesis which displays a diffraction pattern characteristic of zeolitic materials having a CHA-type framework structure.

Thus, as may be taken from the results of Example 2, the use of sodium waterglass alone as the source for SiO$_2$ in the Chabazite material formed leads to a considerably higher crystallinity of the resulting product. Nevertheless, it is apparent from the X-ray diffraction pattern of the material obtained in Example 2 that the resulting product contains somewhat higher levels of crystalline impurities tentatively attributed to Mordenite.

In FIG. 2B, the $^{29}$Si MAS NMR of the crystalline product obtained from the synthetic procedure is shown. As may be taken from the NMR spectrum displayed in FIG. 2B, three major peaks P are observed at −97.5 ppm (P1), −103.3 ppm (P2), and −109.4 ppm (P3), respectively, wherein the relative instensity of the peaks afford a P1:P2:P3 ratio of 0.2157:0.4690:0.2964.

In FIG. 2C, the $^{27}$Al MAS NMR spectrum of the crystalline product is displayed, revealing a peak at −56.1 ppm corresponding to tetrahedrally coordinated Al sites of the chabazite material obtained from organotemplate free synthesis.

Thus, referring to the results displayed and discussed in Example 1, the distinguishing features of the zeolitic materials obtained according to the inventive process is also clearly apparent when comparing the spectra obtained from $^{29}$Si and $^{27}$Al MAS NMR with the respective spectra of the sodium Chabazite samples obtained from templated synthesis displayed in FIGS. 1B and 1C, respectively.

Example 3

Ion Exchange of the Organotemplate-Free Zeolitic Material 7.44 g of the Chabazite material from Example 1 was mixed with 7.44 g of the Chabazite material from Example 2 thus forming a 1:1 mixture. 14.88 g of ammonium nitrate were dissolved in 59.52 g of distilled water placed in a 250 ml flask, after which the mixture of Chabazite materials was added to the solution and the resulting mixture was then heated to 90° C. for 2 h. After letting cool to room temperature, the solid material was filtered off and washed with distilled water until the wash water was free of nitrate. The filter cake was then dried at 120° C. for 16 h after which it was then calcined by heating to 600° C. using a ramp of 1° C./min and holding the material at that temperature for 5 h. The ion exchange procedure was then repeated once after which 12.11 g of a microcrystalline solid was obtained.

Elemental Analysis:
Si: 37 g/100 g
Al: 6 g/100 g
Na: 0.04 g/100 g

Therefore, according to elemental analysis, the $SiO_2$:$Al_2O_3$ molar ratio of the product is approximately 11.9:1.

FIG. 3 shows the XRD of the H-form of the crystalline product obtained from ion exchange, where it is apparent from the diffraction pattern that the CHA-type framework structure of the zeolitic material is maintained.

Example 4

87.71 g of distilled water were placed in a 250 ml autoclave after which 3.57 g of $NaAlO_2$ and 3.04 g of sodium Chabazite seed crystals from Example 1 were added under stirring. Subsequently, 91.12 g of sodium waterglass solution (34 wt.-%) were added slowly thereto. Finally, 15.7 g of LUDOX AS40 (40 wt.-% $SiO_2$) were added, after which the solution was stirred for an additional 2 min, thus affording a synthesis gel displaying a $SiO_2$:$Al_2O_3$:$Na_2O$:$H_2O$ molar ratio of 27:1:7.7:470. The autoclave was then shut and the synthesis mixture heated at 120° C. for 120 h for crystallization. After having let cooled to room temperature, the solid product was filtered off and the filter cake washed three times with distilled water. The filter cake was then dried at 120° C. for 24 h to obtain 15 g of organotemplate-free Chabazite.

Figure 4:
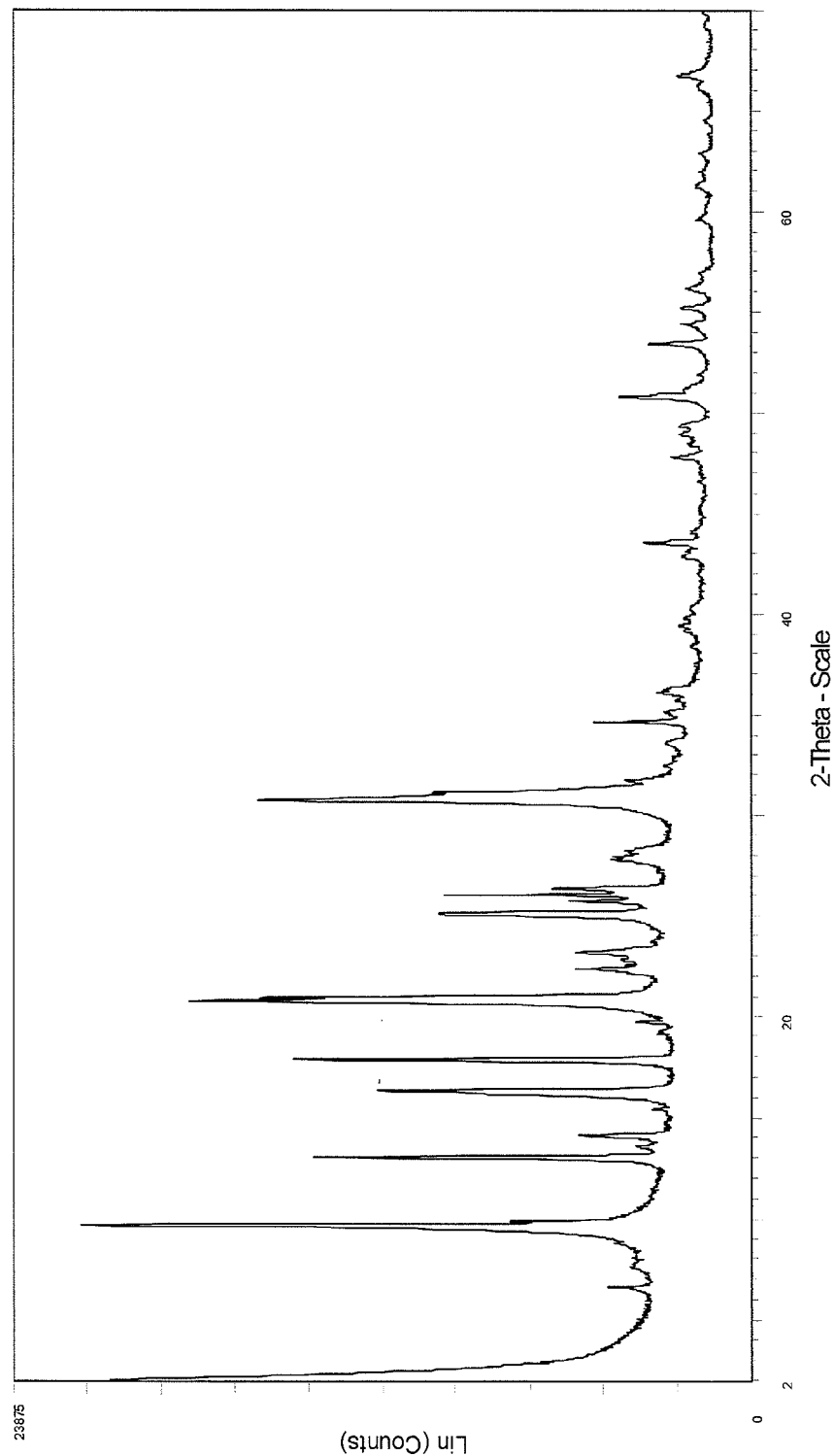
FIG. 4 shows the XRD of the crystallin product obtained from a organotemplate-free synthesis according to one or more embodiments of the invention.

FIG. 4 shows the XRD of the crystalline product obtained from the organotemplate-free synthesis, wherein the diffraction pattern is characteristic for a zeolitic material having a CHA-type framework structure.

Example 5

The synthesis procedure of Example 4 was repeated, wherein the synthesis mixture was heated for 144 h at 120° C., thus affording 16.2 g of organotemplate-free Chabazite.

Figure 5:
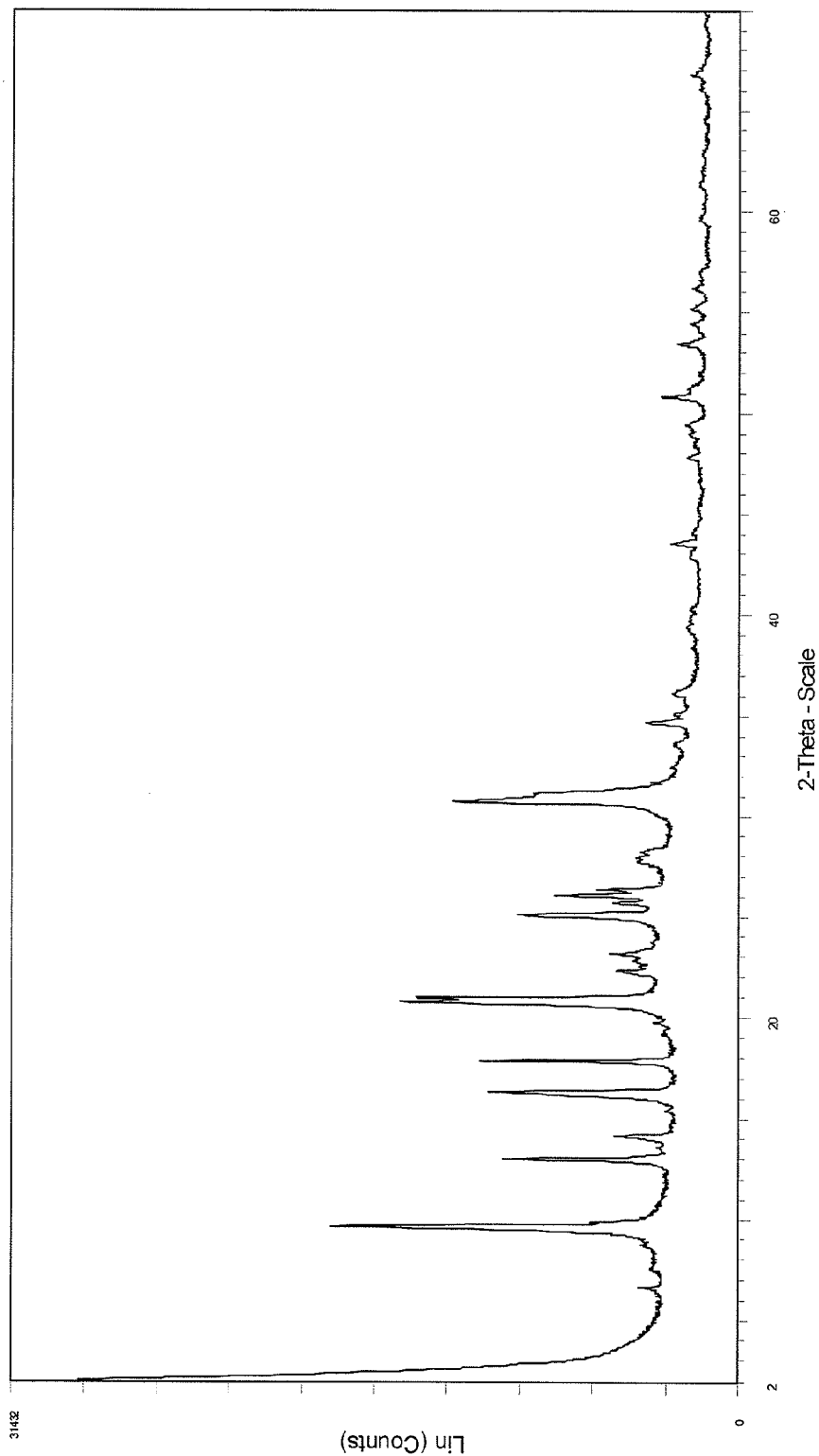
FIG. 5 shows the XRD of a crystalline product obtained according to one or more embodiments of the invention.

FIG. 5 shows the XRD of the crystalline product obtained from said example, wherein it is apparent that compared to Example 4, in addition to obtaining a higher yield, the amount of the minor crystalline impurities is reduced compared to the product obtained from Example 4 of which the XRD is displayed in FIG. 4.

Example 6

89.61 g of distilled water were placed in a 250 ml autoclave to which 4.77 g of $NaAlO_2$ and 3.05 g of sodium Chabazite seed crystals as obtained from Example 1 were then added and the mixture stirred. Subsequently, 84.87 g of an aqueous sodium waterglass solution (34 wt.-%) were slowly added, after which 19.9 g of LUDOX AS40 (40 wt.-% $SiO_2$) were stirred in, and after which the mixture was stirred an additional 2 min, thus affording a synthesis gel having an $SiO_2$:$Al_2O_3$:$Na_2O$:$H_2O$ molar ratio of 20:1:5.8:353. the resulting mixture was then heated in the autoclave under hydrothermal conditions at 120° C. for 120 h. After having let cooled to room temperature, the resulting suspension was filtered off and the filter cake washed three times with distilled water. The filter cake was dried at 120° C. for 24 h, thus affording 19.6 g of Chabazite.

Figure 6:
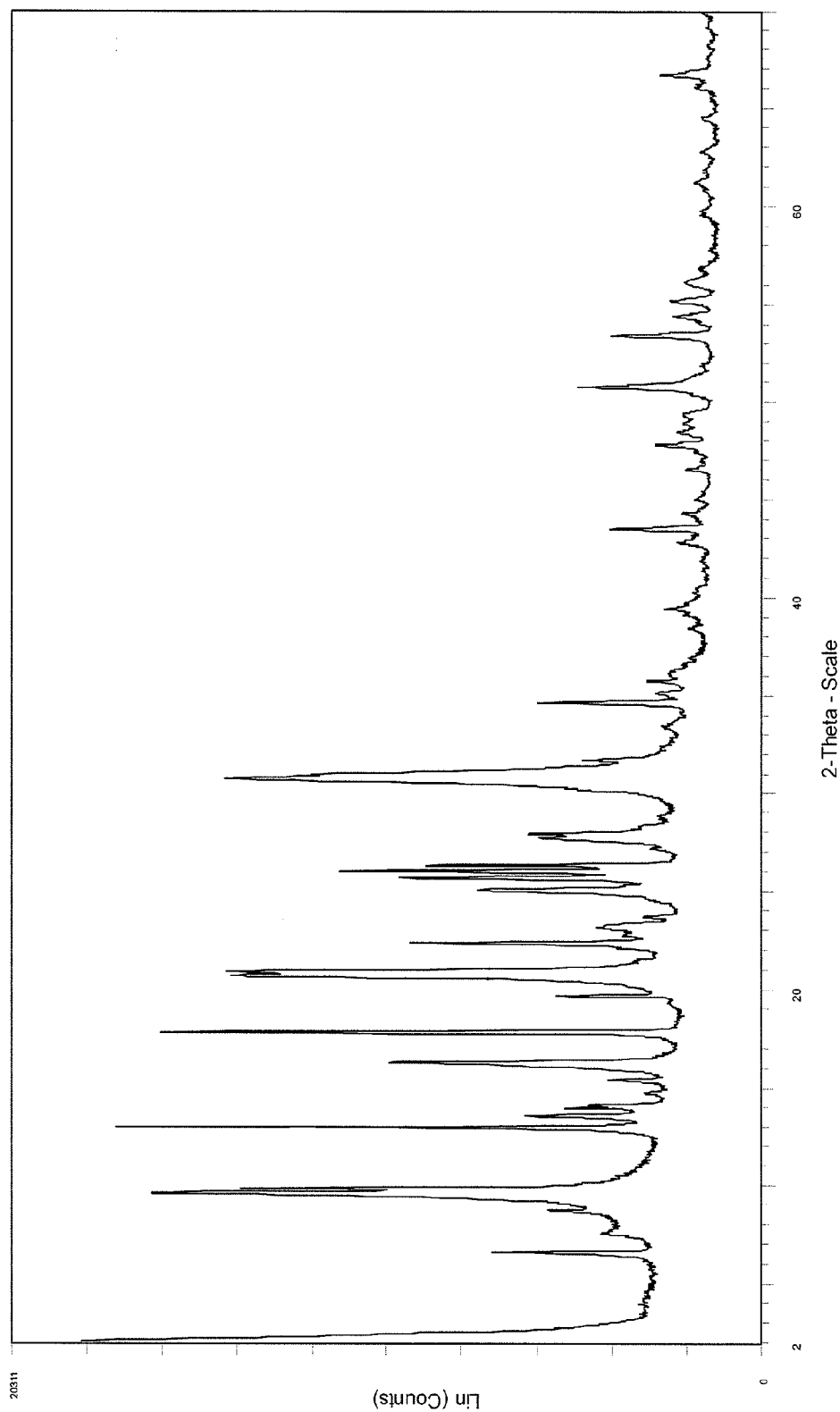
FIG. 6 shows the XRD of the crystalline product obtained from an organotemplate-free synthesis according to one or more embodiments of the invention.

FIG. 6 shows the XRD of the crystalline product obtained from the organotemplate-free synthesis. In particular, besides displaying a diffraction pattern characteristic for zeolitic materials having the CHA-type framework structure, a certain amount of crystalline impurities may be noted which exceeds the amount of such impurities in the product obtained from Examples 1, 2, 4, and 5, respectively. Thus, it is apparent that synthesis gels employing a lower $SiO_2$:$Al_2O_3$ molar ratio afford a product of somewhat lesser purity, wherein however the predominant product obtained is the organotemplate-free material having the CHA-type framework structure in accordance with the present invention.

Example 7

The procedure of Example 6 was repeated wherein the synthesis gel was crystallized for 144 h at 120° C. as opposed to 120 h, thus obtaining 21.4 g of an organotemplate-free Chabazite containing solid product.

Figure 7:
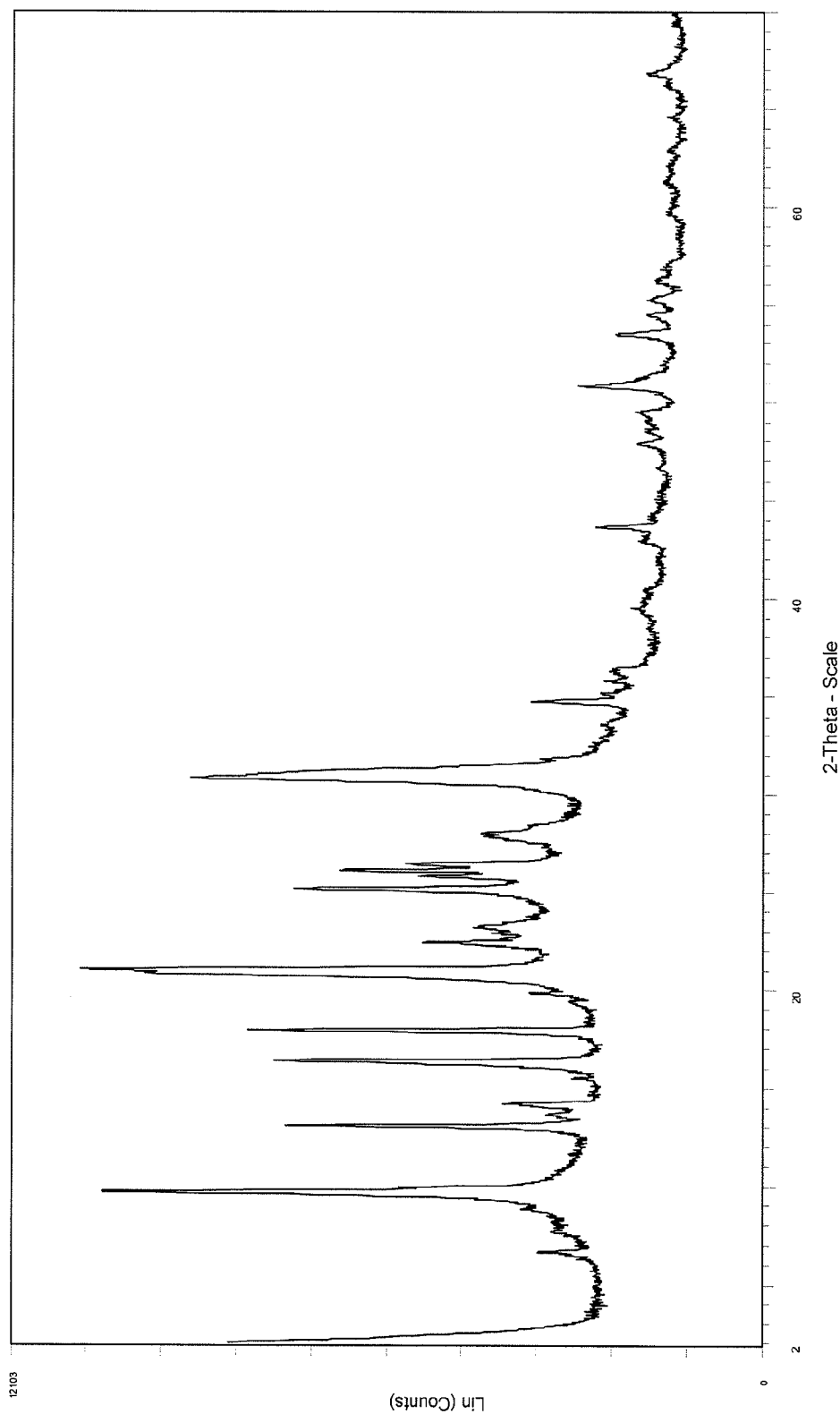
FIG. 7 shows the XRD of the crystalline product obtained from an organotemplate-free synthesis according to one or more embodiments of the invention.

FIG. 7 shows the XRD of the crystalline product obtained from the organotemplate-free synthesis, wherein the diffraction pattern characteristic of a zeolitic material having a CHA-type framework structure remains the dominant characteristic. Nevertheless, it is apparent that a larger amount of amorphous product is produced compared to the product obtained from the procedure of Example 6. On the other hand, it would appear that compared to the Chabazite product obtained from Example 6, the product of the present procedure affords less crystalline impurities which, in particular, are tentatively attributed to Mordenite sideproduct.

Accordingly, as may be taken form a comparison of the examples, a steady lowering of the $SiO_2$:$Al_2O_3$ molar ratio in the respective synthesis gels appears to be responsible for an increase in amorphous and/or crystalline sideproducts present in the reaction product. Nevertheless, as may in particular be taken from the X-ray diffraction patterns obtained for the respective crystallization products, the organotemplate-free zeolitic material having the CHA-type framework structure according to the present invention remains the predominant product in all of the synthetic procedures shown above. Consequently, the present invention provides a highly efficient and versatile method for the production of a highly cost effective organotemplate-free zeolitic material having the CHA-type framework structure which, as displayed in the results from $^{29}$Si and $^{27}$Al MAS NMR spectroscopy may be clearly distinguished from materials obtained according to a methodology involving the use of organotemplates as structure directing agents as displayed above for obtaining the sodium Chabazite seed crystal material.

What is claimed is:

1. An organotemplate-free synthetic process for the production of a zeolitic material having a CHA-type framework structure comprising $YO_2$, $X_2O_3$, and optionally comprising $Z_2O_5$, wherein said process comprises the steps of:
   (1) providing a mixture comprising one or more sources for $YO_2$, one or more sources for $X_2O_3$, and seed crystals having a CHA framework structure, wherein the CHA framework structure of the seed crystals comprises $YO_2$, $X_2O_3$, and optionally comprises $Z_2O_5$; and
   (2) crystallizing the mixture obtained in step (1);
   wherein Y is a tetravalent element, X is a trivalent element, and Z is a pentavalent element,
   wherein optionally one or more sources for $Z_2O_5$ are further provided in step (1), and
   wherein if the CHA framework structure of the seed crystals does not contain $Z_2O_5$, the seed crystals then have a $YO_2$:$X_2O_3$ molar ratio of 5 or greater than 5,
   wherein the mixture provided in step (1) comprises an amount of potassium of 0.001 wt.-% or less.

2. The process of claim 1, wherein if the CHA framework structure of the seed crystals further comprises $Z_2O_5$ in addition to $YO_2$ and $X_2O_3$, the seed crystals then have a $YO_2$:$nX_2O_3$:$pZ_2O_5$ molar ratio, wherein the value for the ratio (1+2p):(n−p) is 5 or greater than 5.

3. The process of claim 1, wherein the $YO_2$:$X_2O_3$ molar ratio of the mixture provided in step (1) ranges from 1 to 200.

4. The process of claim 1, wherein the mixture provided in step (1) comprises one or more alkali metals M.

5. The process of claim 1, wherein the mixture provided in step (1) contains no K and/or no Sr.

6. The process of claim 1, wherein the seed crystals having a CHA framework structure display an X-ray diffraction pattern wherein the most intense reflection has a diffraction angle 2θ in the range of from 5 to 15,
   wherein the diffraction angle 2θ is obtained using Cu K(alpha 1) radiation.

7. The process of claim 1, wherein the seed crystals comprise Y and/or
   wherein Y provided in step (1) in the one or more sources for $YO_2$ are, independently from one another, selected from the group consisting of Si, Sn, Ti, Zr, Ge, and mixtures of two or more thereof.

8. The process of claim 1, wherein the one or more sources for $YO_2$ comprises one or more silicates.

9. The process of claim 8, wherein the mixture provided in step (1) further comprises one or more silicas in addition to the one or more silicates.

10. The process of claim 8, wherein the mixture provided in step (1) comprises water glass.

11. The process of claim 1, wherein the seed crystals comprise X and/or wherein X provided in step (1) in the one or more sources for $X_2O_3$ are, independently from one another, selected from the group consisting of Al, B, In, Ga, and mixtures of two or more thereof.

12. The process of claim 1, wherein the one or more sources for $X_2O_3$ comprises one or more aluminate salts.

13. The process of claim 1, wherein the seed crystals optionally comprise Z
   and/or
   wherein Z in the one or more sources for $Z_2O_5$ optionally further provided in step (1) are, independently from one another, selected from the group consisting of P, As, Sb, Bi, V, Nb, Ta, and combinations of two or more thereof.

14. The process of claim 1, wherein the one or more sources for $Z_2O_5$ comprises one or more phosphates and/or one or more oxides and/or one or more acids of phosphorous.

15. The process of claim 1, wherein the seed crystals having a CHA framework structure comprise one or more zeolites selected from the group consisting of (Ni(deta)$_2$) UT-6, Chabazite, |Li—Na| [Al—Si—O]-CHA, DAF-5, Na-Chabazite, K-Chabazite, LZ-218, Linde D, Linde R, MeAPSO-47, Phi, SAPO-34, SAPO-47, SSZ-13, SSZ-62, UiO-21, Willhendersonite, ZK-14, ZYT-6, and combinations of two or more thereof.

16. The process of claim 1, wherein the amount of seed crystals in the mixture according to step (1) ranges from 0.05 to 50 wt.-% based on 100 wt.-% of $YO_2$ in the one or more sources for $YO_2$.

17. The process of claim 1, wherein the mixture according to step (1) further comprises one or more solvents.

18. The process of claim 1, wherein the mixture according to step (1) comprises water,
   wherein the $H_2O$:$YO_2$ molar ratio of the mixture according to step (1) ranges from 1 to 150.

19. The process of claim 1, wherein the crystallization in step (2) involves heating of the mixture.

20. The process of claim 1, wherein the crystallization in step (2) is conducted under solvothermal conditions.

21. The process of claim 1, wherein the crystallization in step (2) involves heating of the mixture for a period ranging from 5 to 200 h.

22. The process of claim 1 further comprising one or more of the following steps of
   (3) isolating the zeolitic material having a CHA-type framework structure and/or
   (4) washing the zeolitic material having a CHA-type framework structure, and/or
   (5) drying the zeolitic material having a CHA-type framework structure, and/or
   (6) subjecting the zeolitic material having a CHA-type framework structure to an ion-exchange procedure,
   wherein the steps (3) and/or (4) and/or (5) and/or (6) can be conducted in any order.

23. The process of claim 1, wherein in the at least one step (6) at least one ionic non-framework element contained in the zeolitic material having a CHA-type framework is ion-exchanged.

24. The process of claim 1, wherein the organotemplate-free synthesis does not comprise a calcination step.

25. The process of claim 1, wherein the seed crystals comprise a zeolitic material having a CHA-type framework structure as synthesized according to the process of claim 1.

26. A synthetic organotemplate-free zeolitic material having a CHA-type framework structure, optionally obtainable and/or obtained according to claim 1, wherein the CHA framework structure comprises $YO_2$, $X_2O_3$, and optionally comprises $Z_2O_5$, wherein Y is a tetravalent element, X is a trivalent element, and Z is a pentavalent element,
   wherein said zeolitic material is non-calcined, and
   wherein if the CHA framework structure does not contain $Z_2O_5$, the CHA framework structure then has a $YO_2$:$X_2O_3$ molar ratio of 7 or greater than 7, and
   wherein the $^{29}$Si MAS NMR of the zeolitic material comprises:
   a first peak (P1) in the range of from −96 to −98.8 ppm;
   a second peak (P2) in the range of from −102 to −104.5 ppm; and a third peak (P3) in the range of from −109 to −111 ppm;
wherein the integration of the first, second, and third peaks in the $^{29}$Si MAS NMR of the zeolitic material offers a ratio of the integration values P1:P2:P3 ranging from (0.35-0.55):1:(0.1-1.8).

27. A synthetic organotemplate-free zeolitic material having a CHA-type framework structure obtained according to claim 1,
wherein the CHA framework structure comprises $YO_2$, $X_2O_3$, and optionally comprises $Z_2O_5$, wherein Y is a tetravalent element, X is a trivalent element, and Z is a pentavalent element,
wherein said zeolitic material is non-calcined, and
wherein if the CHA framework structure does not contain $Z_2O_5$, the CHA framework structure then has a $YO_2$:$X_2O_3$ molar ratio of 7 or greater than 7.

28. The zeolitic material of claim 27, wherein Y is selected from the group consisting of Si, Sn, Ti, Zr, Ge, and mixtures of two or more thereof.

29. The zeolitic material of claim 27, wherein X is selected from the group consisting of Al, B, In, Ga, and mixtures of two or more thereof.

30. The zeolitic material of claim 27, wherein if the CHA framework structure further comprises $Z_2O_5$ in addition to $YO_2$ and $X_2O_3$, the CHA framework structure then has a $YO_2$:$nX_2O_3$:$pZ_2O_5$ molar ratio, wherein the value for the ratio (1+2p):(n−p) is 7 or greater than 7.

31. The zeolitic material of claim 27, wherein Z is selected from the group consisting of P, As, Sb, Bi, V, Nb, Ta, and combinations of two or more thereof.

32. The zeolitic material of claim 27, wherein the CHA framework structure displays an X-ray diffraction pattern wherein the most intense reflection having an intensity of 100% has a diffraction angle 2θ in the range of from 5 to 15, wherein the diffraction angle 2θ is obtained using Cu K(alpha 1) radiation.

33. The zeolitic material of claim 27, wherein Y comprises Si, and wherein the $^{29}$Si MAS NMR of the zeolitic material comprises:
a first peak (P1) in the range of from −96 to −98.8 ppm;
a second peak (P2) in the range of from −102 to −104.5 ppm; and
a third peak (P3) in the range of from −109 to −111 ppm;
wherein the integration of the first, second, and third peaks in the $^{29}$Si MAS NMR of the zeolitic material offers a ratio of the integration values P1:P2:P3 ranging from (0.35-0.55):1:(0.1-1.8).

34. The zeolitic material of claim 27, wherein X comprises Al, and wherein the $^{27}$Al MAS NMR of the zeolitic material comprises a peak (P'1) in the range of from −54.5 to −57.5 ppm.

35. The zeolitic material of claim 27, wherein the CHA framework comprises one or more alkali metals M as extra-framework ions.

36. The zeolitic material of claim 35, wherein the molar ratio of alkali metal M:$X_2O_3$ ranges from 0.05 to 10.

37. The zeolitic material of claim 35, wherein at least a portion of the alkali metal atoms M is substituted by one or more cation and/or cationic element.

38. The zeolitic material of claim 27, wherein the zeolitic material comprises one or more zeolites selected from the group consisting of (Ni(deta)$_2$)-UT-6, Chabazite, |Li—Na| [Al—Si—O]-CHA, DAF-5, Na-Chabazite, K-Chabazite, LZ-218, Linde D, Linde R, MeAPSO-47, Phi, SAPO-34, SAPO-47, SSZ-13, SSZ-62, UiO-21, Willhendersonite, ZK-14, ZYT-6, and combinations of two or more thereof.

39. A method comprising; contacting the synthetic organotemplate-free zeolititc material having a CHA framework structure according to claim 27 with at least one fluid comprising $NH_3$ and/or $N_2O$, to act as at least one of a molecular sieve, an adsorbent, an ion-exchange material, a catalyst and a catalyst support to thereby (i) oxidize $NH_3$, and/or (ii) decompose N2O.

* * * * *